United States Patent
Terao

(10) Patent No.: US 6,604,165 B1
(45) Date of Patent: *Aug. 5, 2003

(54) LIBRARY CONTROL DEVICE FOR LOGICALLY DIVIDING AND CONTROLLING LIBRARY DEVICE AND METHOD THEREOF

(75) Inventor: Yoshinori Terao, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,392

(22) Filed: Oct. 31, 1997

(30) Foreign Application Priority Data

Feb. 14, 1997 (JP) .............................................. 9-030935

(51) Int. Cl.⁷ ............................................... G11B 17/08
(52) U.S. Cl. ..................... 711/5; 360/98.04; 360/98.05; 360/98.06; 711/4; 711/111; 711/148; 369/30; 369/40
(58) Field of Search ............................. 711/5, 148, 170, 711/173, 1, 4, 100, 111; 345/167, 511; 710/13; 369/30, 34, 98.04, 98.05, 98.06

(56) References Cited

U.S. PATENT DOCUMENTS

| | | | | |
|---|---|---|---|---|
| 4,857,902 A | * | 8/1989 | Naimark et al. ............ | 345/167 |
| 5,287,459 A | * | 2/1994 | Gniewek ..................... | 369/34 |
| 5,305,438 A | * | 4/1994 | MacKay et al. ............ | 345/511 |
| 5,583,561 A | * | 12/1996 | Baker et al. ................... | 348/7 |
| 5,588,138 A | * | 12/1996 | Bai et al. ..................... | 711/173 |
| 5,689,481 A | * | 11/1997 | Tamura et al. ................ | 369/30 |

FOREIGN PATENT DOCUMENTS

| | | |
|---|---|---|
| EP | 0 537 357 | 4/1993 |
| GB | 2 232 524 | * 12/1990 |
| JP | 2 96964 | * 4/1990 |
| JP | 9-185465 | 7/1997 |
| WO | 91/13404 | 9/1991 |

OTHER PUBLICATIONS

"Logical Grouping of Data Storage Media in a Library System", *IBM Technical Disclosure Bulletin*, vol. 35, No. 5, Oct. 1992, pp. 17–20.

"Optical Disk Drive Loader for Work Station with Pluggable Magazine", *IBM Technical Disclosure Bulletin*, vol. 38, No. 12, Dec. 1995, pp. 243–246.

"Performance Efficient Multiple Logical Unit Number Mapping for Redundant Array of Independent Disks", *IBM Technical Disclosure Bulletin*, vol. 39, No. 5, May 1996, pp. 273–274.

* cited by examiner

Primary Examiner—B. James Peikari
(74) Attorney, Agent, or Firm—Staas & Halsey LLP

(57) ABSTRACT

The library device is divided into a plurality of logical units in units of frames, and a transport element, an import/export element, a data transfer element etc, are provided in each logical unit. The library controller receives commands for each logical unit containing a virtual element address and processes these commands as being linked.

25 Claims, 38 Drawing Sheets

|      | Bit7 | Bit6 | Bit5 | Bit4 | Bit3 | Bit2 | Bit1 | Bit0 |
|------|------|------|------|------|------|------|------|------|
| CDB 0 | Operation Code = A 5 (Hex) ||||||||
| CDB 1 | LUN ||| Reserved |||||
| CDB 2 | (MSB) | Transport Element Address |||||||
| CDB 3 | | | | | | | | (LSB) |
| CDB 4 | (MSB) | Source Element Address |||||||
| CDB 5 | | | | | | | | (LSB) |
| CDB 6 | (MSB) | Destination Element Address |||||||
| CDB 7 | | | | | | | | (LSB) |
| CDB 8 | Reserved ||||||| INV* |
| CDB 9 | Control Byte ||||||||

INV : Invert

FIG. 5

| NAME OF FRAME | REAL FUNCTION | DEFINITION AS ELEMENT IN SCSI | VIRTUAL ELEMENT | LUN | ELEMENT ADDRESS |
|---|---|---|---|---|---|
| RAU | ACC | Transport | | 0 | 0000(h) |
| | CAS | Import/Export | | | 0001(h) |
| | GENERAL CELL | Storage | | | 0002 ~ 00FF(h) |
| | | | Import/Export(RAU-DAU0)* | | 0100(h) |
| | | | Import/Export(RAU-TAU0)** | | 0101(h) |
| | | | Import/Export(RAU-LAU)*** | | 0102(h) |
| | | | Data Transfer***** | | 0103 ~ 010A(h) |

FIG. 7

| NAME OF FRAME | REAL FUNCTION | DEFINITION AS ELEMENT IN SCSI | VIRTUAL ELEMENT | LUN | ELEMENT ADDRESS |
|---|---|---|---|---|---|
| DAU0 | DEE | Storage | | 1 | 0000 ~ F000(h) |
| | GENERAL CELL | Storage | | | F001 ~ FF00(h) |
| | | | Import/Export(DAU0-RAU)* | | FF01(h) |
| | | | Import/Export(DAU0-TAU0)** | | FF02(h) |
| | | | Import/Export(DAU0-LAU)*** | | FF03(h) |
| | | | Transport**** | | FF04(h) |
| | | | Import/Export***** | | FF05(h) |
| | | | Data Transfer Element****** | | FF06 ~ FF0D(h) |

FIG. 8

| NAME OF FRAME | REAL FUNCTION | DEFINITION AS ELEMENT IN SCSI | VIRTUAL ELEMENT | LUN | ELEMENT ADDRESS |
|---|---|---|---|---|---|
| TAU0 | MTU | Data Transfer | | 2 | 0000 ~ 0007(h) |
| | GENERAL CELL | Storage | | | 0008 ~ 1000(h) |
| | | | Import/Export(TAU0-DAU0)* | | 1001(h) |
| | | | Import/Export(TAU0-LAU)* | | 1002(h) |
| | | | Import/Export(TAU0-RAU)** | | 1003(h) |
| | | | Transport*** | | 1004(h) |
| | | | Import/Export**** | | 1005(h) |

FIG. 9

| NAME OF FRAME | REAL FUNCTION | DEFINITION AS ELEMENT IN SCSI | VIRTUAL ELEMENT | LUN | ELEMENT ADDRESS |
|---|---|---|---|---|---|
| LAU | ACC | Transport | | 3 | 0000(h) |
| | CAS | Import/Export | | | 0001(h) |
| | GENERAL CELL | Storage | | | 0002 ~ 00FF(h) |
| | | | Import/Export(LAU-TAU0)* | | 0100(h) |
| | | | Import/Export(LAU-DAU0)** | | 0101(h) |
| | | | Import/Export(LAU-RAU)*** | | 0102(h) |
| | | | Data Transfer***** | | 0103 ~ 010A(h) |

FIG. 10

| MTU No. | LUN0 | LUN1 | LUN2 | LUN3 |
|---------|------|------|------|------|
| MTU (0) | 0103 | FF06 | 0000 | 0103 |
| MTU (1) | 0104 | FF07 | 0001 | 0104 |
| MTU (2) | 0105 | FF08 | 0002 | 0105 |
| MTU (3) | 0106 | FF09 | 0003 | 0106 |
| MTU (4) | 0107 | FF0A | 0004 | 0107 |
| MTU (5) | 0108 | FF0B | 0005 | 0108 |
| MTU (6) | 0109 | FF0C | 0006 | 0109 |
| MTU (7) | 010A | FF0D | 0007 | 010A |

FIG. 11

| No. | NAME OF DATA | Bit 19 | Bit 18-16 | Bit 15-0 |
|---|---|---|---|---|
| 1 | RAU-DAU0 | Flag | LUN | Source Address (Hex) |
| 2 | RAU-TAU0 | Flag | LUN | Source Address (Hex) |
| 3 | RAU-LAU | Flag | LUN | Source Address (Hex) |
| 4 | DAU0-TAU0 | Flag | LUN | Source Address (Hex) |
| 5 | DAU0-LAU | Flag | LUN | Source Address (Hex) |
| 6 | TAU0-LAU | Flag | LUN | Source Address (Hex) |

FIG. 12

LIBRARY CONTROL DEVICE FOR LOGICALLY DIVIDING AND CONTROLLING LIBRARY DEVICE AND METHOD THEREOF

BACKGROUND OF THE INVENTION

1. Field of the Invention

The present invention relates to a technology for controlling a large-scale library device by using a small-scale host computer, more specifically, to a library control device for logically dividing a library device into a plurality of logical units and controlling it, and a method thereof.

2. Description of the Related Art

Recently, a library device is put to commercial use in various fields for automatically performing import/export, storage, read/write of a recording medium and the like. As such a recording medium, an optical disk, compact disk read only memory (CD-ROM), magnetic tape or so on, is utilized.

FIG. 1A is a schematic drawing of the conventional large-scale magnetic tape library. In general, a large scale magnetic tape library set (MTL) consists of frames for each function. The magnetic tape library in FIG. 1A comprises four frames, RAU, DAU 0, TAU 0, and LAU storing MT cartridges, and is controlled by the library controller 1 in the frame ACU. FIG. 1B is a schematic diagram of in the internal configuration of the subsystem of the magnetic tape library.

RAU is a frame located on the right side of the subsystem and is a frame comprising a cartridge access station (CAS) 5, accessor (ACC) 6, and a plurality of cells (CELLs) 7. CAS 5 is a special cell for importing/exporting a recording medium to the library device and is operable in the online (READY) state. ACC 6 is a robot for transporting the recording medium within the library device, and the cells 7 are slots for storing recording media.

DAU 0 is a frame comprising a direct entry exit unit (DEE) 2 and a plurality of cells 7. DEE 2 is a unit for importing/exporting a recording medium in units of frames in the offline (NOT READY) state. DEE 2, for example, by providing a rotating cell drum and a large access door 3, can perform the import/export operations of a large quantity of the recording media in a short time.

TAU 0 is a frame comprising a plurality of magnetic tape units (MTUs) 4 and a plurality of cells 7. MTU 4 is a cell for driving a recording medium for reading/writing. LAU, similar to RAU, is located on the left side and comprises CAS 5, ACC 6, and a plurality of cells 7.

ACC 6 can move arbitrarily among the frames, and transports the recording medium to and from each of CAS 5, CELLs 7, DEE 2 and MTU 4, according to an instruction from the library controller 1.

In such a conventional magnetic tape library as described above, the addresses of the CELLs 7, DEE 2, CAS 5, and MTU 4, are controlled by a combination of the frame number with the addresses within that frame. In RAU, DAU 0, TAU 0, and LAU, for example, the frame numbers 01, 02, 03, and 04 are allocated to each frame, and addresses of three bytes are utilized for each frame.

Further to this, it has been recently requested that a large-scale library device be controlled by a small-scale host computer such as a personal computer or work station. In this case, it is necessary to connect the host computer and the library device with a general purpose interface such as the small computer system interface (SCSI-2) defined in the American National Standard Institute (ANSI) X3B10 for controlling the library device as a medium changer device specified in SCSI-2. In this case, such problems are raised as described below:

(1) Generally, in SCSI, one set of a large-scale library device is defined as one logical unit. The logical unit means a unit of the control object controlled by the host computer, and the host computer can command the medium transfer in the logical unit so long as the logical unit corresponds to the medium changer device.

But, the cell addresses defined as the SCSI medium changer device are 2 bytes at most, corresponding to $2^{16}$ (approximately 65,000 cells). Accordingly, a library device with a larger number of cells cannot be controlled by commands in the standard SCSI.

(2) In a conventional large-scale library device, each frame can be set into the offline state for maintenance while the subsystem is active. On the other hand, nothing can be done in SCSI to command the partial offline state for maintenance. It is necessary to set the whole library device into the offline state in this case.

(3) A set of the library device comprises CAS 5 and DEE 2 for importing/exporting a recording medium. Contrary to this, in SCSI, CAS 5 is defined as an import/export (I/E) element and DEE 2 as a storage (ST) element. Accordingly, it is impossible in SCSI to unify import/export operations of the recording medium as a function in a whole unit.

(4) It is possible to extend a large-scale library device frame by frame. But, when the library device is defined as a medium changer device in SCSI, the cell address must be revised after extension, because all the cell addresses are changed.

(5) A large-scale library device is assembled in units of frames. A plurality of frames are combined into one set of the library device, in accordance with a predetermined model. Accordingly, a frame is disposed in a different manner when the model changes. If a cell address is defined with a plurality of frames as a library device, the cell address changes relative to a model change, resulting in disabling the physical representation of the cell address from manufacture.

Conventionally, it was mandatory to write cell addresses address on completion of a model, or to write cell addresses from the viewpoint of a model to be used. Cell addresses can be determined after completion of a library device set, but it is necessary to modify addresses whenever frames are added. Accordingly, the same problem will be raised as described above in (4), in the case of address representation.

As described by items (1) to (5) above, it is extremely difficult to put the library device under the control of SCSI, in which applicable addresses are restricted, because recent large-scale library devices are equipped with much more advanced facilities than the conventional medium changer device in SCSI-2.

SUMMARY OF THE INVENTION

The object of the present invention is to provide a library control device for controlling a large-scale library device by means of such a general-use interface as SCSI and a method thereof.

In the first aspect of the present invention, the library control device comprises a memory unit and a control unit. The memory unit stores logical structure information representing the configuration of the library device divided into a plurality of logical units, each suitable for independent control. The control unit controls the operations of the library device using the logical structure information.

Each frame of the library device is, for example, regarded as one logical unit in SCSI, and the library device is divided into as many logical units as frames. Accordingly, even in such a large-scale library device with more addresses than are available using 2 bytes, each division of it is independently controllable as a medium changer device in SCSI.

In the logical structure information stored in the memory unit, 2 bytes of element addresses such as cell addresses are written for each of the logical units.

The host system issues the medium transfer commands to the medium changer device and directs the control unit to control the library device, and it is necessary to assign element addresses of an accessor, a transfer source, and a transfer destination, when the command is issued.

Accordingly, a virtual transport element is provided to logical units containing no accessor (ACC), and the element addresses are assigned. These element addresses correspond to an address of the real ACC. Thus, the medium transfer command can be issued even to logical units containing no ACCs.

Further, virtual import/export elements are provided with the function to import/export a recording medium between two logical units, so as to enable commands for recording medium transfer, and element addresses are assigned to these virtual elements.

The control unit processes the commands to different logical units in association with a check of the logical structure information, on receipt of a command for each logical unit from the host system. Based on the result of this process, the control signal is issued to control the library device.

As explained above, the logically divided library device can be controlled in a unified manner by providing virtual functional elements which do not exist in each of the library devices, in cooperation with the SCSI interface.

In the second aspect of the present invention, the library device comprises a storage unit and a control unit. The storage unit stores a plurality of recording media, and the control unit controls the library device by dividing it into a plurality of logical units, each suitable for independent control.

In the third aspect of the present invention, the control device comprises a memory unit and a control unit. The memory unit stores logical structure information representing the configuration of a control object divided into a plurality of logical units, each suitable for independent control. The control unit controls the control object using the logical structure information.

Still further, in the fourth aspect of the present invention, the host system comprises a memory unit and a command issuing unit. The memory unit stores logical structure information representing the configuration of the library device divided into a plurality of logical units each suitable for independent control. The command issuing unit issues commands to each of the plurality of logical units.

BRIEF DESCRIPTION OF DRAWINGS

These and other objects, features and advantages of the present invention will become more apparent in light of the following detailed description of a best mode embodiment thereof, as illustrated in the accompanying drawings.

FIG. 5 is a table showing a medium transfer command in SCSI;

FIG. 7 is a table showing element addressed of LUN 0;

FIG. 8 is a table showing element addresses of LUN 1;

FIG. 9 is a table showing element addresses of LUN 2;

FIG. 10 is a table showing element addresses of LUN 3;

FIG. 11 is an address reference table for data transfer elements;

FIG. 12 is a table showing control data;

DESCRIPTION OF THE PREFERRED EMBODIMENTS

An embodiment of the present invention will now be described in detail hereinafter with reference to the attached drawings.

Figure 2A:
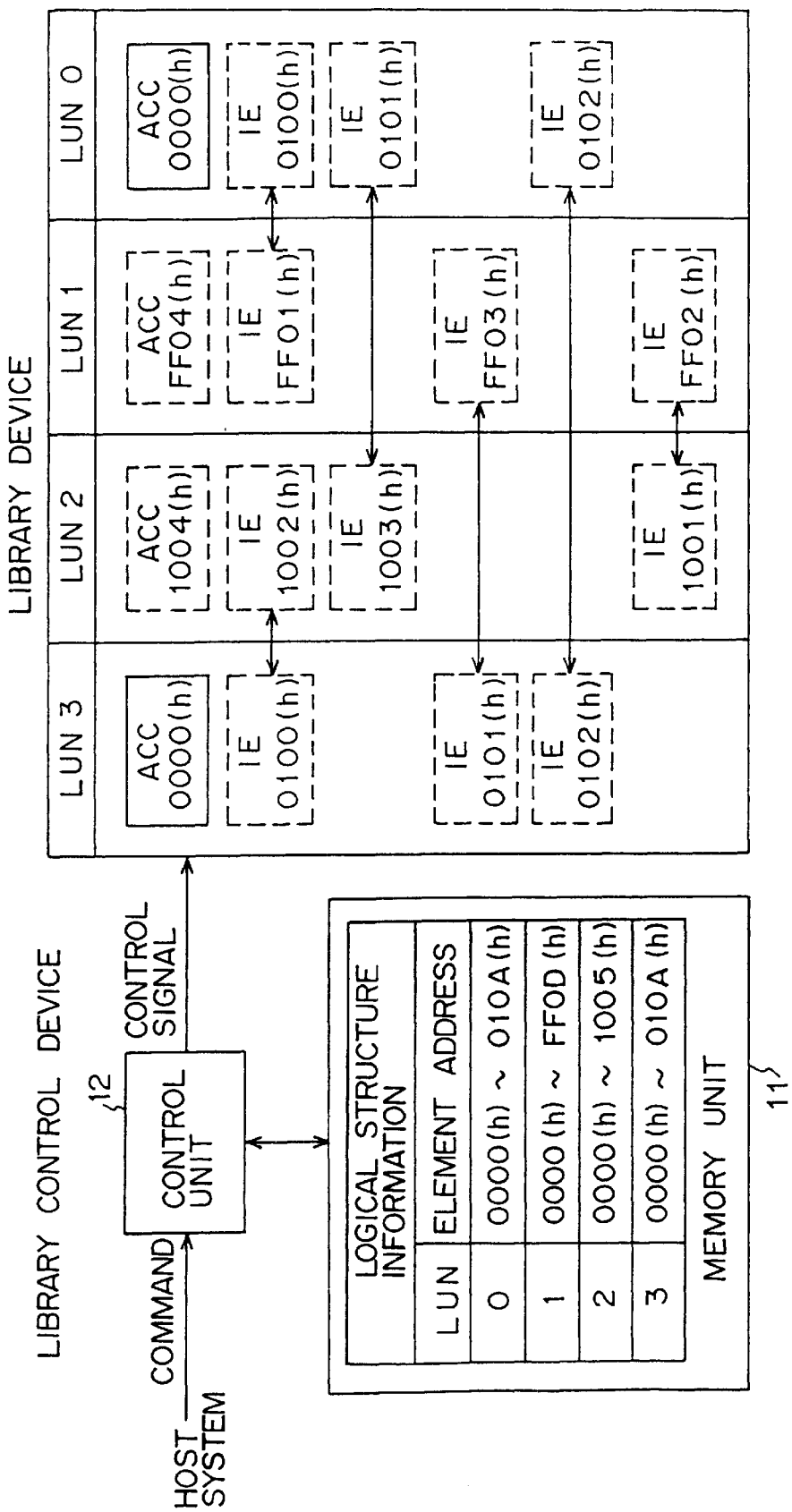
FIG. 2A shows a principle chart of the library control device according to the present invention.

FIG. 2A shows a principle of the library control device according to the present invention. The library control device comprises a memory unit 11 and a control unit 12.

The memory unit stores the logical structure information representing the configuration of the library device, divided into a plurality of logical units each suitable for independent control. The control unit controls the operations of the library device using the logical structure information.

Each frame of the library device is, for example, considered to be one logical unit in SCSI and the library device is divided into as many logical units as there are frames. Accordingly, even in such a large-scale library device with more addresses than are available using 2 bytes, each division of it is independently controllable as a medium changer device in SCSI.

In the logical structure information stored in the memory unit 11, the 2 bytes of the element addresses such as cell addresses are written for each of the logical units. LUN represents a logical unit number and the letter (h) in the column for the element address shows that the addresses are written as hexadecimal numbers.

The host system issues a medium transfer command to the medium changer device and directs the control unit 12 to control the library device, and it is necessary to assign element addresses of the accessor, the transfer source, and the transfer destination, when the command is issued.

Contrary to this, in the library device in FIG. 2A, no accessors are included in either LUN 1 or LUN 2.

Accordingly, as shown by a dotted line, a virtual accessor is provided in these logical units and an element address is assigned to the virtual accessor. This element address is made to correspond to an address of a real accessor. Thus, the medium transfer command can be issued to both LUN 1 and LUN 2.

Further, virtual import/export elements with the function of transferring a recording medium between two adjoining or remote logical units are provided so as to facilitate the recording medium transfer between different logical units, and element addresses are assigned to these virtual elements. As indicated by arrows, the host system can command a transfer between different logical units by issuing two linked commands to a pair of import/export elements corresponding to each other.

In the case of a command to transfer a medium from LUN 0 to LUN 1, for example, a first command is initially issued to LUN 0 to transfer the medium to the address 0100, followed by a second command to LUN 1 to transfer the medium from the address FF01.

The control unit 12 processes the commands to different logical units in association with a check of the logical structure information, on receipt of the command from the host system, for each logical unit. Based on the result of this process, the control signal is issued to control the library device.

On receiving the first and second commands, for example, the destination address 0100 of the first command is recognized to correspond to the source address FF01 of the second command, by referring to the logical structure information. At this time, it is considered that the recording medium is transferred between these virtual elements, and the library device is controlled to transfer the recording medium directly from the source element address of the first command, to the destination element address of the second command.

In such a manner as described above, the logically divided library device can be controlled in a unified manner by providing virtual functional elements which do not exist in each of the library devices, in co-operation with the SCSI interface.

Further, the NOT READY state can be set in each of the logical units by logically dividing the library device. In the case of the number of frames of the library device being increased, the added frames can be defined as new ones, and no revision is required to the addresses of the existing elements. Accordingly, predetermined addresses can be stored even though the model is structurally modified or upgraded, without rewriting addresses represented on manufacture.

The memory unit 11 in FIG. 2A, for example, corresponds to the memory 33 in FIG. 4 described later, the control unit 12 corresponds to the interface 31, 34, and processing unit 32, and the logical structure information corresponds to the address information shown in FIGS. 7, 8, 9, 10 and 11.

Figure 1A:
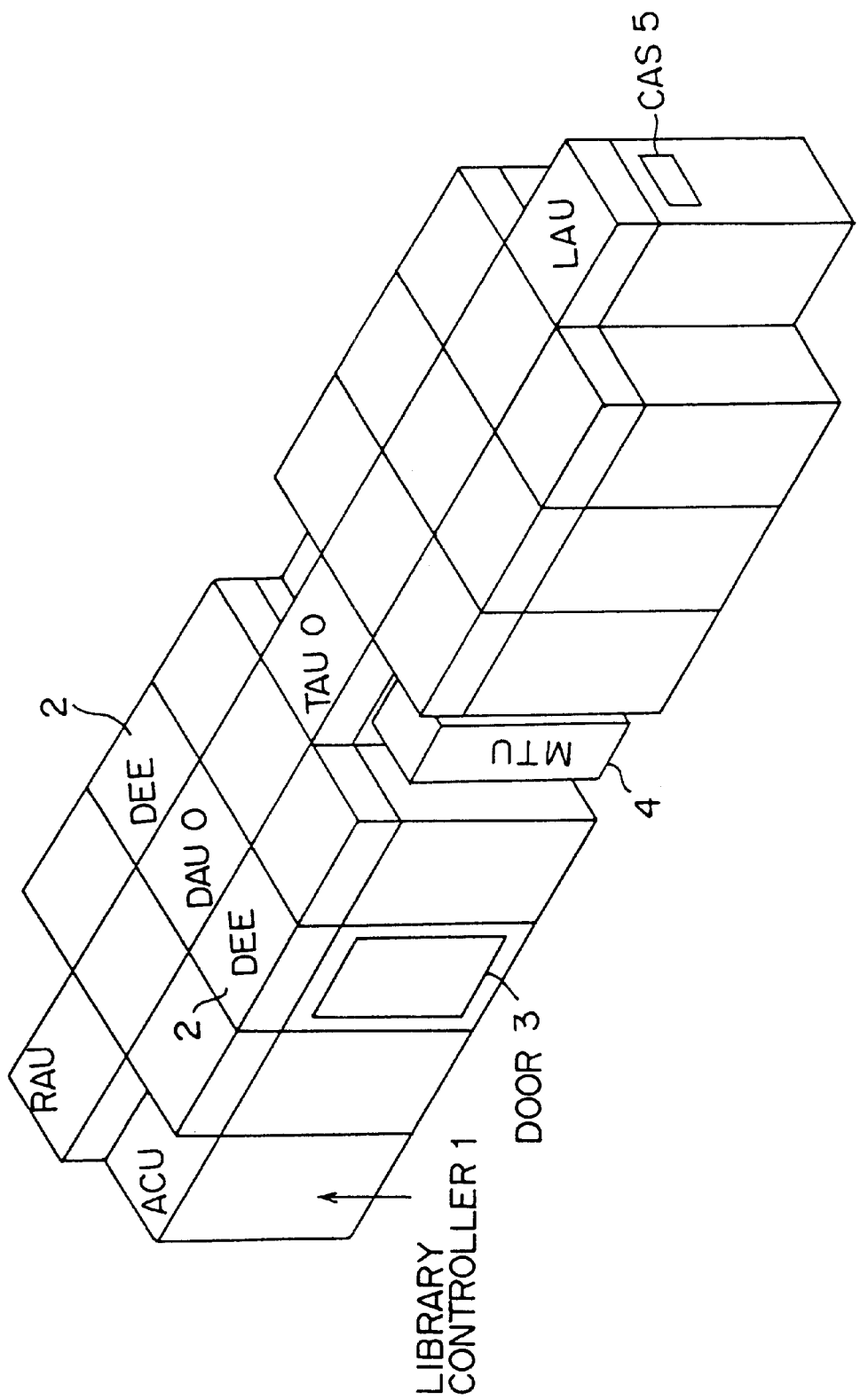
FIG. 1A is a schematic diagram of the library device.

In the present invention, the library controller 1 (FIG. 1A) of the library device interprets a command set for the medium changer device in SCSI to control the library device, by association with the library management software of the upper host computer. Therefore, the library controller 1 serves as the SCSI controller. In order to increase the number of cell addresses available to the medium changer device, the library device is logically divided into a plurality of logical units, not treated as one logical unit as in SCSI-2.

In one example of the preferred embodiments as described below, a logical unit number (LUN) in SCSI is assigned to each of the frames comprising the library device. Thus, 2 byte addresses can be defined for each frame, and it is possible to deal with the large-scale library device with more cell addresses than are available using 2 bytes.

The host computer issues to the library controller 1 one or more commands directing linking operations among a plurality of logical units or frames under control, resulting in controlling a library device set. In order to enable linking operations in different logical units, virtual cells are provided, as described below, in each frame:

(a) virtual medium transport units are allocated to all frames. In other words, virtual cells representing accessors are provided to frames other than those having an accessor 6.

(b) The adjoining frames in the library device are connected by providing virtual cells with the function of transferring a recording medium.

(c) The remote frames in the library device are also connected by providing virtual cells with the function of transferring a recording medium.

In the above items (a) to (c), to provide virtual cells means to set cell addresses representing dummy functions. The library controller 1 recognizes whether or not the command issued from the host computer to each LUN is a transfer command necessary to be linked with other LUNs.

When the command is issued to such specific virtual cells as described in the above (a) to (c), the library controller 1 stores the command without executing any operation, until a series of commands have been issued to terminate the linking operation.

Figure 2B:
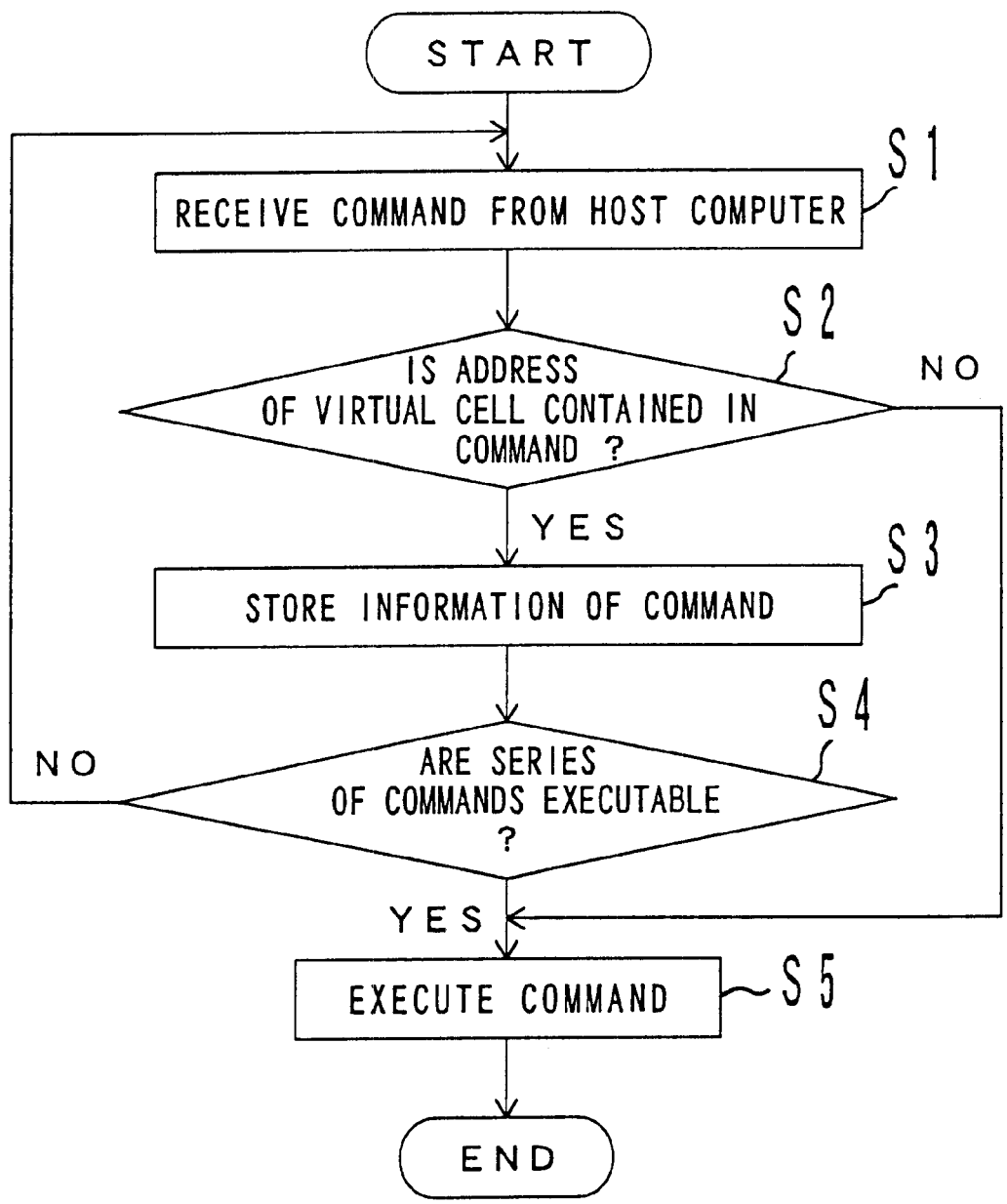
FIG. 2B is a flowchart of the control processing of a plurality of the logical units.

FIG. 2B is a flowchart of the control process in a plurality of logical units performed by the library controller 1. On starting the process, the library controller 1 receives a command for one of the logical units from the host computer (step S1), followed by the determination of whether or not any virtual cell address is included in the received command (step S2), and the received command is temporarily stored if such addresses are included (step S3).

Further, a decision is made as to whether or not a series of stored commands are executable (step S4). These commands are judged executable if the addresses of the virtual cells included in these commands constitute a corresponding pair, and if the physical transfer source and destination of the recording medium can be specified. On the other hand, these commands are judged unexecutable if virtual cell addresses which do not correspond to any of the addresses of existing real units remain in the commands.

If a series of commands are judged unexecutable, the following command is fed from the host computer (step S1), and the iterative process in and after step S2 is performed. If a series of commands are executable, these commands are interpreted together to operate the library device (step S5), and the process is terminated. In step S2, the command is instantly executed to terminate the process, when it is determined that no addresses of virtual cells are included in the command.

In such a manner as described above, one frame can be regarded as one logical unit controllable in SCSI, by providing appropriate virtual cells in each frame. Accordingly, the host computer can issue a medium transfer command to each frame. Further, it is made possible to set the address of the virtual cell in correspondence with a real function and to control the logically divided library device by interpreting and executing a series of mutually related commands.

In addition, the library device can inform the host computer of the NOT READY state in each LUN when it is required to set a frame into the NOT READY state, since the host computer individually controls each of the logical units.

Figure 1B:
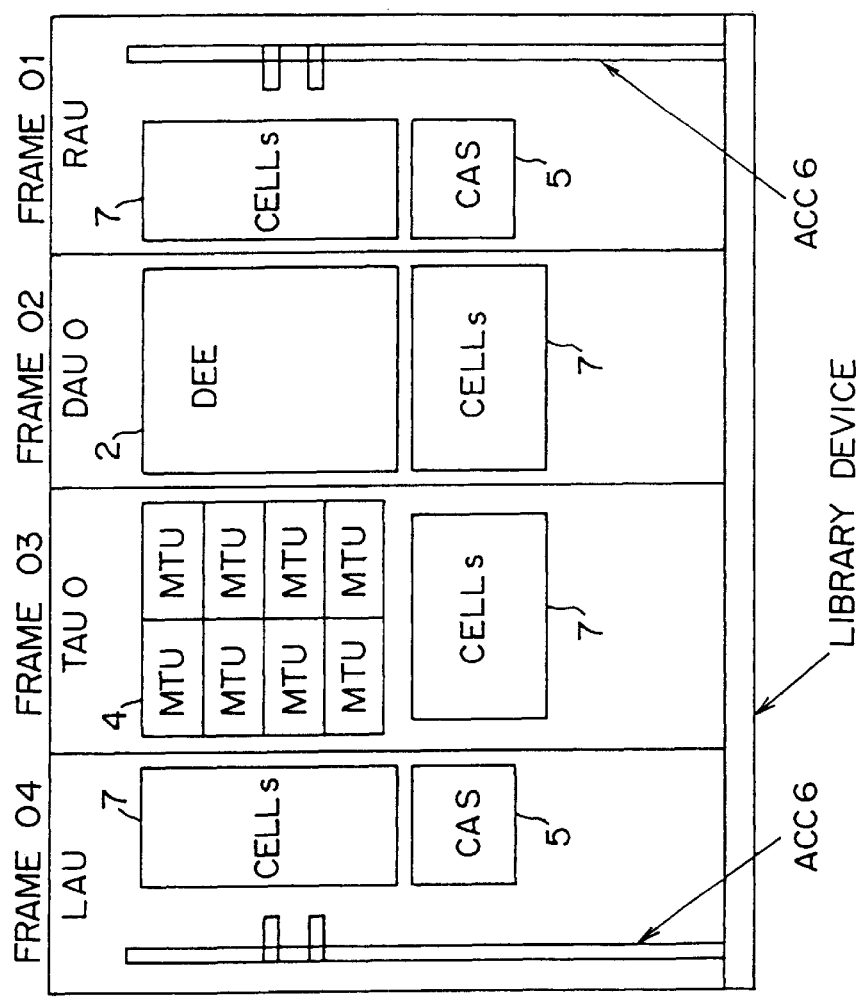
FIG. 1B is a structural diagram of the library device.
Figure 3:
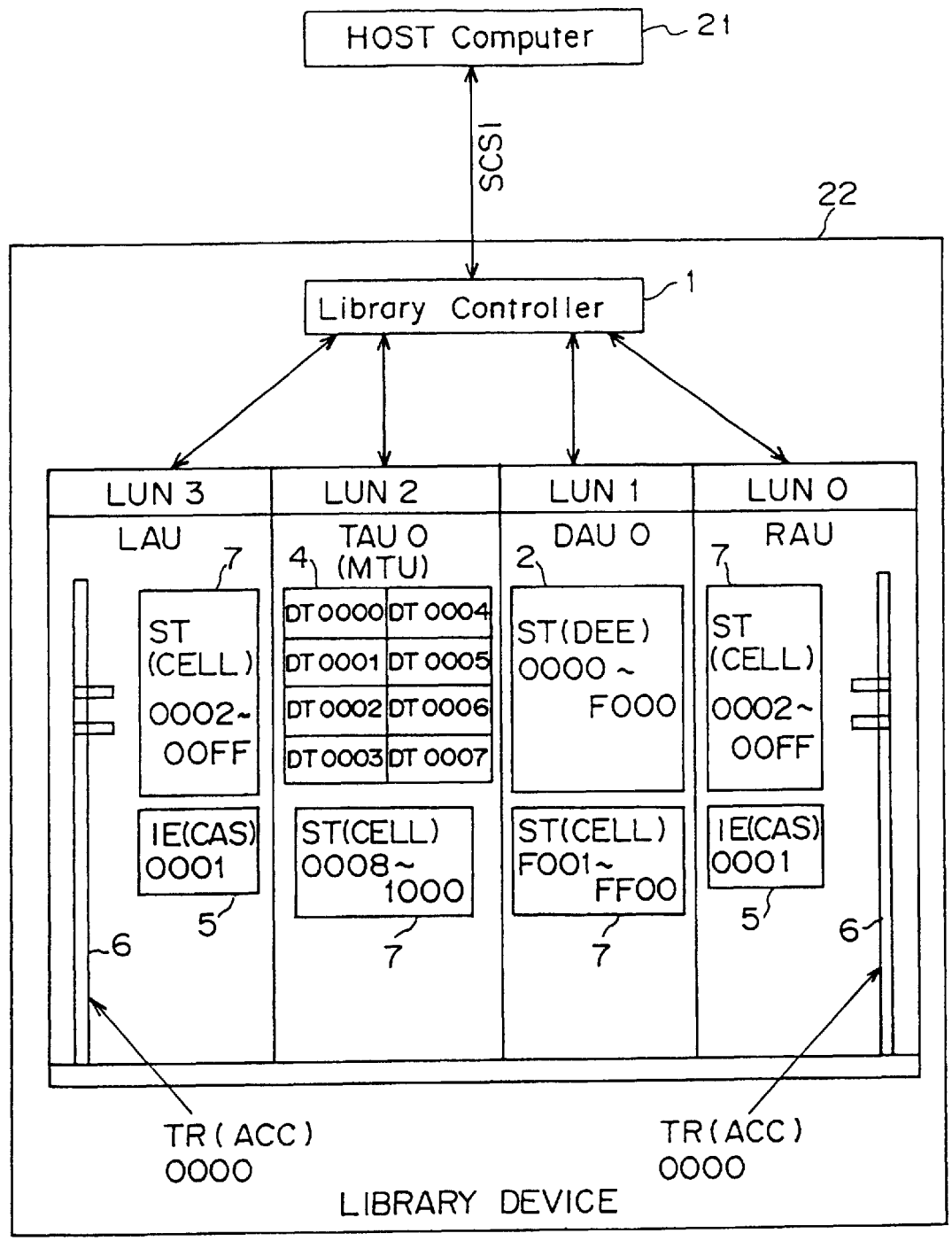
FIG. 3 is a structural diagram of the control system.

FIG. 3 shows the structure of the control system in the large-scale library device as one of the preferred embodiments. The library device 22 in FIG. 3, corresponding to the library device in FIGS. 1A and 1B, operates on receipt of the commands from the host computer 21 having a SCSI interface.

In the library device described above, LUN 0, LUN 1, LUN 2, and LUN 3 are assigned to the four frames RAU, DAU 0, TAU 0, and LAU, in that order, and each frame is recognized as an independent logical unit. In some cases as described below, each frame is identified in accordance with the LUN form. The frame RAU, for example, is only represented as LUN 0.

In FIG. 3, the accessor 6 in LUN 0 and LUN 3 is defined as the transport element (TR) in SCSI, and the hexadecimal address 0000 is assigned. In this case, an element in SCSI means a cell in the broader sense, including the real cell 7.

CAS 5 is defined as the import/export element (IE) to which the address 0001 is assigned. The cells 7 are defined as the storage elements (ST) to which the addresses 0002 to 00FF are assigned. In LUN 1 both DEE 2 and the cells 7 are defined as the storage elements to which the addresses 0000 to F000 and F0001 to FF00 are assigned, respectively.

8 sets of MTU 4 in LUN 2 are all defined as data transfer elements (DT) to which the addresses 0000 to 0007 are assigned, and the cells 7 in LUN 2 are defined as the storage elements to which the addresses 0008 to 1000 are assigned.

Figure 4:
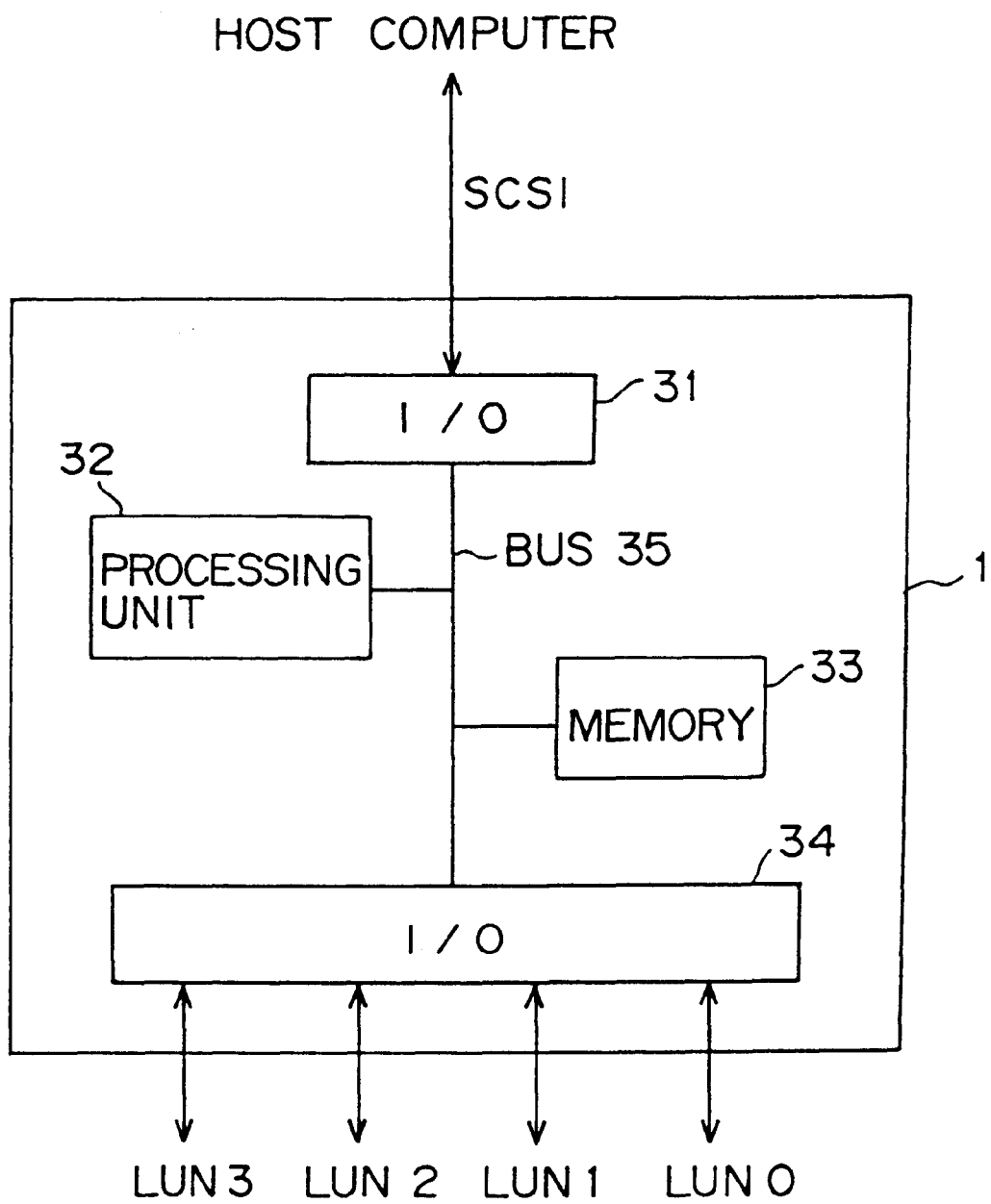
FIG. 4 is a structural diagram of the library controller.

FIG. 4 is a structural chart of the library controller 1 shown in FIG. 3. The library controller 1 comprises a SCSI input/output interface (I/O) 31, processing unit 32, memory 33, and input/output interface (I/O) 34 for each frame. These elements are connected by means of a bus 35.

The interface 31 receives the commands from the host computer 21 and transmits the response back to the host computer 21. The memory 33 includes a read only memory (ROM) for storing data and programs and a random access memory (RAM) for processing.

The processing unit 32 executes the programs stored in the memory 33 using the data stored in the memory 33. Based on the result, the command is interpreted to instruct an operation in each frame. The interface 34 sends a control signal on the basis of the control from the processing unit 32. In this manner, the library controller 1 executes the commands from the host computer 21 to operate the library device 22.

FIG. 5 shows a data configuration of the medium transfer command (MOVE command) in SCSI, transferred to the library controller 1. In the MOVE command in FIG. 5, CDB 0 represents the operation code corresponding to the medium transfer, and CDB 1 shows the LUN of the logical unit of the command issue object.

CDB 2 and CDB 3 represent the address of the transport element in the logical unit, CDB 4 and CDB 5 the address of the source element, and CDB 6 and CDB 7 the address of the destination element. These addresses are represented in the form of 2 bytes.

As described above, the MOVE command in SCSI can direct the medium transfer only between the elements in a specified logical unit. The MOVE command, however, cannot direct the medium transfer between different logical units. Additionally, in the library device 22 in FIG. 3, no accessor is included in LUN 1 and LUN 2, and no definition is given to the transport element. Therefore, the MOVE command cannot be issued to these logical units without some modification.

Figure 6:
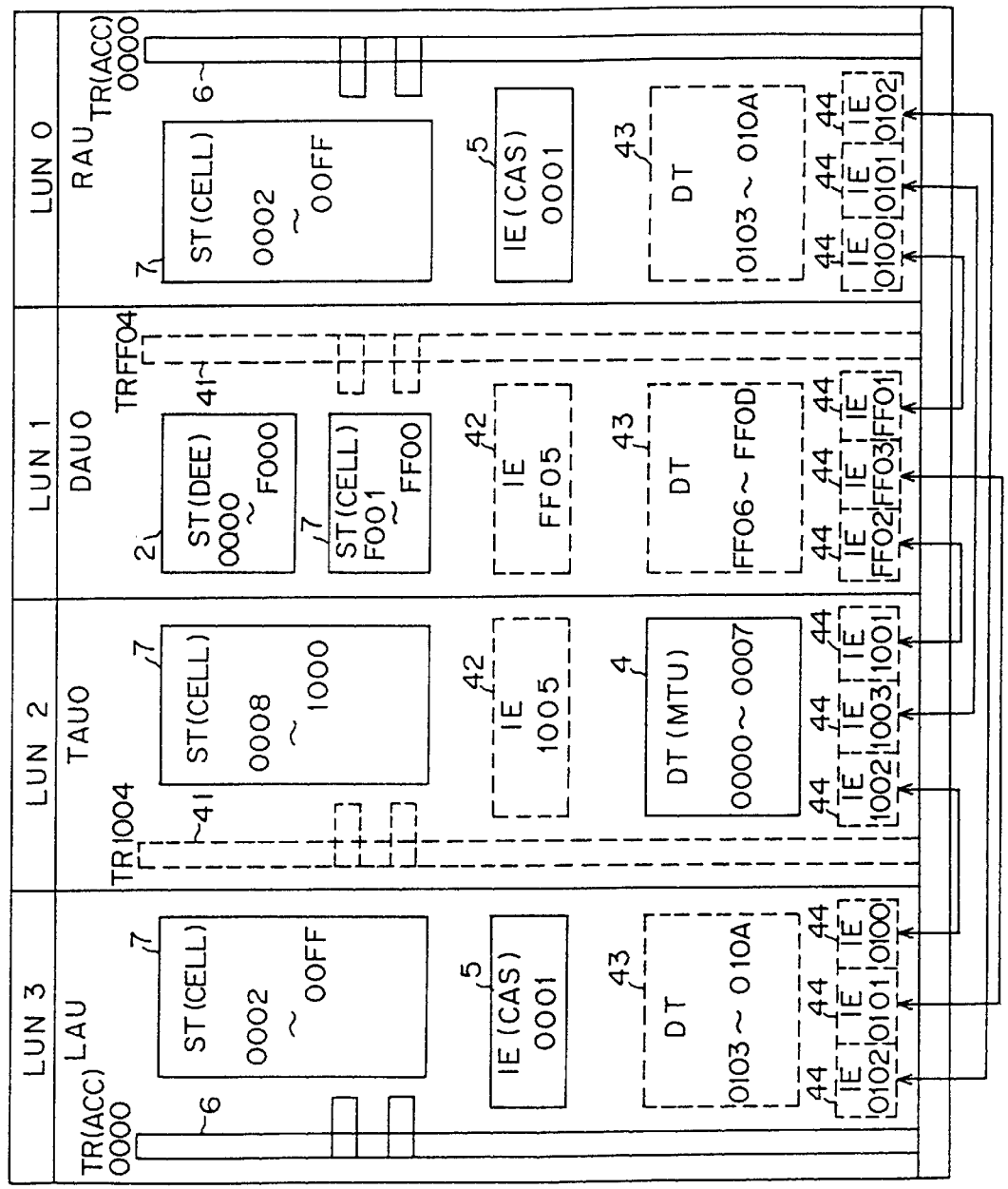
FIG. 6 is a structural diagram showing virtual elements.

Accordingly, as shown in FIG. 6, the host computer 21 provides an appropriate virtual transport element, virtual import/export element, and virtual data transfer element, and issues the MOVE command including the addresses of these virtual elements.

In FIG. 6, the virtual transport element 41 and the virtual import/export element 42 are provided to LUN 1 and LUN 2 having no ACC 6 and CAS 5. The transport element 41 and the import/export element 42 respectively correspond to the real ACC 6 and CAS 5.

The addresses 1004 and 1005 are assigned respectively to the transport element 41 and the import/export element 42 in LUN 2 and the addresses FF04 and FF05 are assigned respectively to the transport element 41 and the import/export element 42 in LUN 1.

Thus, by using the virtual transport element 41, the host computer 21 can utilize the transport element address (CDB 2 and CDB 3) of the MOVE command to cover LUN 1 and LUN 2, and can issue a MOVE command to these frames.

Further, by using the virtual import/export element 42, the host computer can utilize addresses corresponding to CAS 5 in other frames, as the source element address (CDB 4 and CDB 5) or the destination element address (CDB 6 and CDB 7) of the MOVE command to LUN 1 and LUN 2. As a result, the recording medium transfer between CAS 5 and LUN 1 or LUN 2 can be directly commanded to LUN 1 or LUN 2.

8 sets of virtual data transfer elements corresponding to 8 sets of MTU 4 in LUN 2 are provided to LUN 0, LUN 1, and LUN 3 which have no MTU 4. The addresses 0103 to 001A are assigned to the data transfer elements 43 in LUN 0 and LUN 3, and the addresses FF06 to FF0D to the data transfer elements 43 in LUN 1.

Thus, by using the virtual data transfer element 43, the host computer 21 can utilize addresses corresponding to MTU 4 in LUN 2, as the source element address or the designation element address of the MOVE command to LUN 0, LUN 1, and LUN 3. As a result, the recording medium transfer between MTU 4 and LUN 0, LUN 1, or LUN 3 can be directly commanded to LUN 0, LUN 1, or LUN 3.

In order to enable the recording medium to be imported/exported between arbitrary frames, a virtual import/export element 44 is provided for all frames. The addresses 0100, 0101, and 0102 are assigned to the 3 sets of import/export elements 44 in LUN 0, and the addresses FF01, FF02 and FF03 to the 3 sets of import/export elements in LUN 1.

Further, the addresses 1001, 1002 and 1003 are assigned to the 3 sets of import/export elements 44 in LUN 2, and the addresses 0100, 0101 and 0102 to the 3 sets of import/export elements 44 in LUN 3.

In these import/export elements, the element 44 at the address 0100 in LUN 0 corresponds to the element 44 at the address FF01 in LUN 1. The virtual recording medium transfer can be performed between these elements.

Accordingly, the host computer 21 can direct the recording medium transfer between LUN 0 and LUN 1, by applying the addresses of these import/export elements 44 to the source element or the destination element of the MOVE command.

Similarly, the import/export element 44 at the address 0101 in LUN 0 corresponds to the import/export element 44 at the address 1003 in LUN 2, and the import/export element 44 at the address 0102 in LUN 0 to the import/export element 44 at the address 0102 in LUN 3.

The import/export element 44 at the address FF02 in LUN 1 corresponds to the import/export element 44 at the address 1001 in LUN 2, the import/export element 44 at the address FF03 in LUN 1 corresponds to the import/export element 44 at the address 0101 in LUN 3, and the import/export element 44 at the address 1002 in LUN 2 corresponds to the import/export element 44 at the address 0100 in LUN 3.

In such a manner, through the virtual import/export element 44, the host computer 21 can utilize addresses corresponding to other frames as the source element or the destination element of the MOVE command, and the recording medium transfer can be directed between arbitrary frames.

FIGS. 7 to 10 are tables showing the addresses of each of the real and the virtual elements. FIGS. 7, 8, 9, 10 show the element addresses of LUN 0, LUN 1, LUN 2 and LUN 3, respectively.

In these FIGS, the real function represents the real element shown by the solid lines in FIG. 6, and the virtual element represents the virtual element shown by the dotted lines in FIG. 6. For example, the notation import/export (RAU–DAU 0) in FIG. 7 represents that this is the element for virtually importing/exporting the recording medium between RAU and DAU. The letter (h) in the element address shows that the addresses are given as hexadecimal numbers.

The virtual element with the symbol '*' corresponds to the element 44 for virtually importing/exporting the recording medium between two frames in adjoining positions, and the virtual element with the symbol '' is the element 44** for virtually importing/exporting the recording medium between two frames in remote positions.

Further, the virtual element with the symbol '*' corresponds to the transport element 41, the virtual element with the symbol '' corresponds to the import/export element 42, and the virtual element with the symbol '*' corresponds to the data transfer element 43**.

The data transfer elements 43 in LUN 0, LUN 1, and LUN 3 are in one-to-one correspondence with the addresses of MTU 4 in LUN 2, and the relation is shown in the address reference table in FIG. 11. In FIG. 11, the symbol MTU (i) (i=0, 1, 2, . . . 7) corresponds to the addresses 0000 to 0007 in FIG. 3, respectively.

The host computer 21 and the library controller 1 store the LUN and a part or all of the address information shown in FIGS. 7 to 11 as the management information, and control the library device 22 with reference to the information.

As described above, on the basis of the characteristics of the large-scale library device that the number of real transport elements, data transfer elements, and import/export elements is extremely small compared with the number of medium storage elements, the present embodiment divides the whole library device 22 into frames as logical units in SCSI.

Further, by providing the virtual transfer elements 41, import/export elements 42 and 44, and data transfer elements 43, the divided large-scale library device is controlled for the recording medium transfer between logical units. Detailed explanation will be given in the following about the control method.

A general operation of the library device 22 is summarized as follows:

(1) Commands in Accordance with an Application Program

The application program executed in the host computer 21 specifies the volume name of the recording medium, and informs the library management software in the host computer 21 of the operating procedure of the library device 22. The volume name, for example, is given in a combination of six letters/figures. The operating procedure includes the action of mounting a recording medium in the MTU 4, the exporting action from DEE 2 or CAS 5 out of the library device 22, and the like.

Two examples are given in the information for a transfer inside the library device 22; that the destination address is explicitly informed, and that the destination address is not informed, for the purpose of utilizing the automatic address assignment by the library management software.

(2) Process of the Library Management Software

The library management software calculate from the informed volume name an element address of the library device 22 in which the objective recording medium is stored. In addition, the library management software determines the destination element address of the recording medium, in accordance with the operation procedure informed by the application program. Depending on the operation procedure, however, there are some cases when no recording medium transfer is required.

(3) Command Issue

The library management software issues the appropriate commands for dealing with the recording medium through the interface between the host computer 21 and the library controller 1.

(4) Process of the Library Controller

The library controller 1 operates the recording medium in accordance with the commands from the host computer 21.

Hereafter, the operating examples are described concerning the library device 22 of the present invention.

The first operating example is that the recording medium of the volume 'XXXXXX' in the address 1000 of DEE 2 in the frame DAU 0 is mounted in MTU 4 at the address 0001 in the frame TAU 0. The above operation is explained according to the general operation described above, as follows:

(1) Command in Accordance with an Application Program

The application program informs the library management software of a command for mounting the volume 'XXXXXX' in MTU 4. At this point, no destination element address is specified.

(2) Operation of the Library Management Software

The library management software retrieves the element address information that the volume 'XXXXXX' is stored, recognizes that it is stored at the address 1000 of LUN 1, checks for free space in MTU 4, and decides, for example, that the volume can be mounted in the address 0001 in TAU 0.

One of the methods for retrieving the element address from the volume name is that it is retrieved from a medium information database managed by the library management software. Another method is that correspondence information between the volume information of the recording medium and the element address is included in the library controller 1, and that the command for collecting such information is issued to the library controller 1 for retrieval by the library management software. In general, the former method is often used.

(3) Command Issue

The library management software initially issues the MOVE command for LUN 1 to the library controller 1. By this command, the recording medium in the address 1000 in DAU 0 is transferred to the virtual import/export element 44 at the address FF02 for a transfer from DAU 0 to TAU 0, by utilizing the virtual transport element 41 at the address FF04.

Further, the library management software issues the MOVE command for LUN 2. By this command, the recording medium in the virtual import/export element 44 in the address 1001 in TAU 0 is transferred to MTU 4 in the address 0001, by utilizing the transport element 41 in the address 1004.

(4) Operation of the Library Controller

On receiving the initial MOVE command, the library controller 1 supposes that the recording medium in the address 1000 in DAU 0 is transferred to the import/export element 44 in the address FF02. On receiving the second MOVE command, the library device 22 is really operated to transfer the recording medium. At this point, the accessor 6 in RAU or LAU is operated to mount the recording medium from the address 1000 in DAU 0 in MTU 4 in the address 0001 in TAU 0.

In the first operating example described in the above (1) to (4), the recording medium transfer is realized between the adjoining logical units, by utilizing the virtual transport element 41 and the virtual import/export element 44.

In consideration of the logical division of the library device 22, the library management software issues a plurality of related commands necessary for operating the recording medium to the library controller 1, and enables the medium operation by the application program in the host computer 21. The library controller 1 controls the divided library device 22 by processing a plurality of received commands which are linked.

Further, in the case of the recording medium transfer between remote positions, not between adjoining positions, the recording medium is transferred in turn to the adjoining logical unit by liking a plurality of commands, finalizing the transfer to a remote destination.

Or, the direct transfer can be commanded by utilizing the import/export element directly connecting the remote logical units. The latter is more effective than the former because the number of commands is reduced in the latter.

The second operating example is that the volume 'YYYYYY' in the address 0002 of the frame RAU is mounted in MTU4 in the address 0001 in the frame TAU 0. The operation in this example is explained in accordance with the general operation described above.

(1) Commands in Accordance With an Application Program

The application program directs the library management software to mount the volume 'YYYYYY' in MTU 4. In this case, no destination element address is specified.

(2) Operation of the Library Management Software

The library management software retrieves the element address information that the volume 'YYYYYY' is stored, recognizes that it is stored at the address 0002 in LUN 0, checks for free space in MTU 4, and decides to mount it in MTU 4 in the address 0001 in TAU 0. The same method for retrieval is taken in this case as in the first operating example.

(3) Command Issue

The library management software issues the MOVE command for LUN 0 to the library controller 1. In accordance with this command, the recording medium in the address 0002 in RAU is directed to move to the virtual data transfer element 43 in the address 0104, by utilizing the transport element 6 in the address 0000.

(4) Operation of the Library Controller

On receiving the MOVE command described above, the library controller 1 confirms, with reference to the address table in FIG. 11, that the data transfer element 43 in the address 0104 corresponds to MTU 4 in the address 0001 in LUN 2 (TAU 0), and mounts the recording medium from the address 0002 in RAU in MTU 4 in the address 0001 in TAU 0.

In the second example shown in the above (1) to (4), the recording medium transfer from the logical unit having no MTU 4, to the logical unit having MTU 4, can be executed by a single command by utilizing virtual data transfer element 43. When the specific MTU 4 is occupied, a free data transfer element 43 can be easily searched for by setting a flag indicating 'IN USE' state at the data transfer element 43 corresponding to that MTU 4.

Similarly, providing virtual import/export element 42 to the logical unit having no CAS 5, the recording medium transfer between the logical unit and a logical unit having CAS 5 is realized. For example, if the recording medium transfer from the CELL 7 in RAU to MTU 4 in TAU 0 in the second operating example is replaced by the recording medium transfer from DEE 2 in DAU 0 to CAS 5 in RAU or LAU, the operation described above can be explained with ease.

Accordingly, for the third operating example, such case is projected as moving the volume 'ZZZZZZ' from the address 0000 in the frame DAU 0 to CAS 5. The operation in this case will be explained in accordance with the general operation described above.

(1) Command in Accordance with an Application Program

The application program informs the library management software to move the volume 'ZZZZZZ' to CAS 5. At this time, the destination element address is not specified.

(2) Process of the Library Management Software

The library management software retrieves the element address information that the volume 'ZZZZZZ' is stored, recognizes that it is stored at the address 0000 in DAU 0, checks for free space in CAS 5, and determines to move the volume to CAS 5 in the address 0001 in RAU. The same procedure is executed in the retrieval as in the first operating example described above.

(3) Command Issue

The library management software issues to the library controller 1 the MOVE command for LUN 1. This command directs the library controller 1 to move the recording medium from the address 0000 in DAU 0 to the virtual import/export element 42 in the address FF05, by utilizing the virtual transport element 41 in the address FF04.

(4) Operation of the Library Controller

On receiving the above MOVE command, the library controller 1 confirms that the import/export element 42 in the address FF05 corresponds to CAS 5 in the address 0001 in RAU. Further, the library controller 1 actuates ACC 6 in RAU to move the recording medium from the address 0000 in DAU 0 to CAS 5 in RAU.

For the fourth operating example, an explanation will be given with resect to the import/export operation by the operator using DEE 2 in the frame DAU 0.

(1) The Operator sets DAU 0 offline by operating a switch or the like installed on DEE 2.

(2) When the library controller 1 detects the designation of the offline state of DAU 0, the library controller 1 changes LUN 1 to the NOT READY state, and disables DAU 0 to execute commands from the host computer 21 during the NOT READY state. Other frames, RAU, TAU 0, LAU, are in the READY state and remain operable.

(3) As the library controller 1 permits the NOT READY state, the door 3 of the DEE 2 can be opened. The operator opens the door 3 and starts the import/export operation of the recording media.

(4) When the operator informs the library controller 1 of the termination of the import/export operation by operating the switch, the library controller 1 changes LUN 1 to the READY state.

In the fourth operating example, the READY/NOT READY state can be controlled for each of the logical units. Therefore, it is clearly represented that a specific logical unit can be used on the SCSI interface. Accordingly, it becomes possible to keep the library device 22 active during maintenance and to make it partially offline for maintenance.

Moreover, in the present embodiments, when a new frame is added to the library device 22, the library controller 1 has only to add the LUN of the new frame to the control information, while the LUNs of the existing frames are unmodified. No revision of unit addresses is required.

For example, when DAU 1 with the same structure as DAU 0 is added, similar control can be realized by defining the new frame as LUN 4 and providing virtual elements for linking with each of the existing LUNs. At this point, the addresses of the existing elements do not change in the view of the library management software of the host computer 21. Therefore, no revision is required to the existing addresses on the addition of frames.

Since the system controls each frame as an independent logical unit, the location of a frame can be determined arbitrary in the library device 22. It is possible to show the element addresses designated in the frame on manufacture. No changes are required in the addresses even in cases of model change or frame addition.

Further, with reference to FIGS. 12 to 36, detailed explanation will be given about one example of a control process program by means of the library controller 1. FIG. 12 shows the table for storing control data for the virtual import/export element 44. This table is stored in the memory 33 of the library controller 1.

In FIG. 12, a pair of import/export elements 44 are shown as a mutually corresponding set. For example, the first control data 'RAU–DAU 0' relates to the recording medium transfer between RAU and DAU 0, and is used for controlling a set of paired import/export elements 44 in the address 0100 in RAU (LUN 0) and in the address FF01 in DAU 0(LUN 1).

When the host computer 21 issues the MOVE command including an address of one of these import/export elements 44 as the destination, the library controller 1 sets the flag of the bit 19 in the control data 'RAU–DAU 0', and writes the LUN (3 bits) of the command and the source element address (16 bits) into the bits 18–0. By the above operation, the library controller 1 recognizes the completion of the command to transfer the recording medium between RAU and DAU 0.

On receiving the MOVE command including another corresponding address as the source, the library controller 1 resets the flag of the control data. By using LUN and the address written in the control data, LUN of the command and the destination element address, the library controller 1 commands the real operation to the library device 22. The library controller 1 sets the flag by writing, for example, '1' to the flag, and resets the flag by writing '0'.

Similarly, the second control data 'RAU–TAU 0' controls a pair of the import/export elements 44 in the address 0101 in RAU and in the address 1003 in TAU 0(LUN 2). The third control data 'RAU–LAU' controls a pair of the import/export elements 44 in the address 0102 in RAU and in the address 0102 in LAU (LUN 3).

The fourth control data 'DAU 0–TAU 0' controls a pair of the import/export elements 44 in the address FF02 in DAU 0 and in the address 1001 in TAU 0, and the fifth control data 'DAU 0–LAU' controls a pair of the import/export elements 44 in the address FF03 in DAU 0 and in the address 0101 in LAU.

The sixth control data 'TAU 0–LAU' controls a pair of the import/export elements 44 in the address 1002 in TAU 0 and in the address 0100 in LAU.

Figure 13:
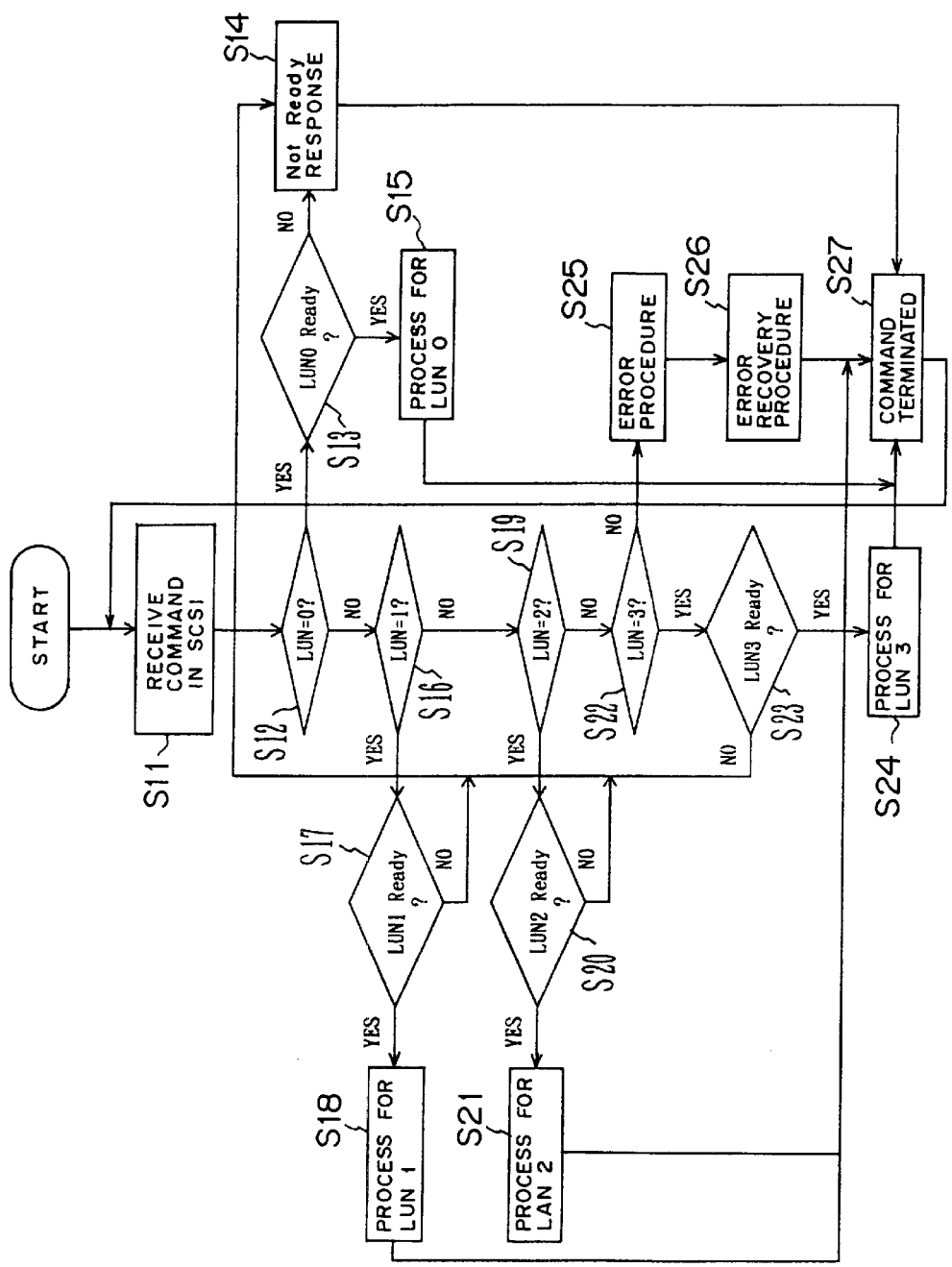
FIG. 13 is a flowchart of the processing of the library controller.

FIG. 13 shows the overall flowchart of the library controller 1. On starting the process and receiving one SCSI command (step S11), the library controller 1 determines, first of all, whether or not the LUN written in the command is 0 (step S12). If LUN is 0, the library controller confirms if LUN 0 is in the READY state (step S13).

If LUN 0 is in the READY state, a process for LUN 0 is performed (step S15), and the command is terminated (step S27). If LUN 0 is not ready, the library controller 1 returns the NOT READY response to the host computer 21 (step S14) and the command is terminated (step S27).

If LUN of the command is not 0, it confirms if LUN is 1 (step S16). If LUN is 1, it confirms if LUN 1 is READY (step S17). If LUN 1 is READY, a process for LUN 1 is performed (step S18), and the command is terminated(step S27). If LUN is not READY, the NOT READY response is returned to the host computer 21 (step S14) and the command is terminated (step S27).

If LUN is not 1, it confirms if LUN is 2 (step S19). If LUN is 2, it confirms if it is READY (step S20). If LUN 2 is READY, a process for LUN 2 is performed (step S21), and the command is terminated (step S27). If LUN 2 is NOT READY, the NOT READY response is returned (step S14) and the command is terminated (step S27).

If LUN of the command is not 2, it determines if LUN is 3 (step S22). If LUN is 3, it confirms if LUN 3 is READY (step S23). If LUN 3 is READY, a process for LUN 3 is performed (step S24), and the command is terminated (step S27). If LUN 3 is NOT READY, the NOT READY response is returned (step S14) and the command is terminated (step S27).

If LUN of the command is not 3, no corresponding logical unit exists, and an error procedure is executed (step S25). In the error procedure, the library controller 1 informs, for example, the host computer 21 of an error. After the error recovery procedure (step S26), the command is terminated (step S27). On completion of one command, the library controller 1 receives the following command from the host computer 21 and executes the same procedure.

Figure 14:
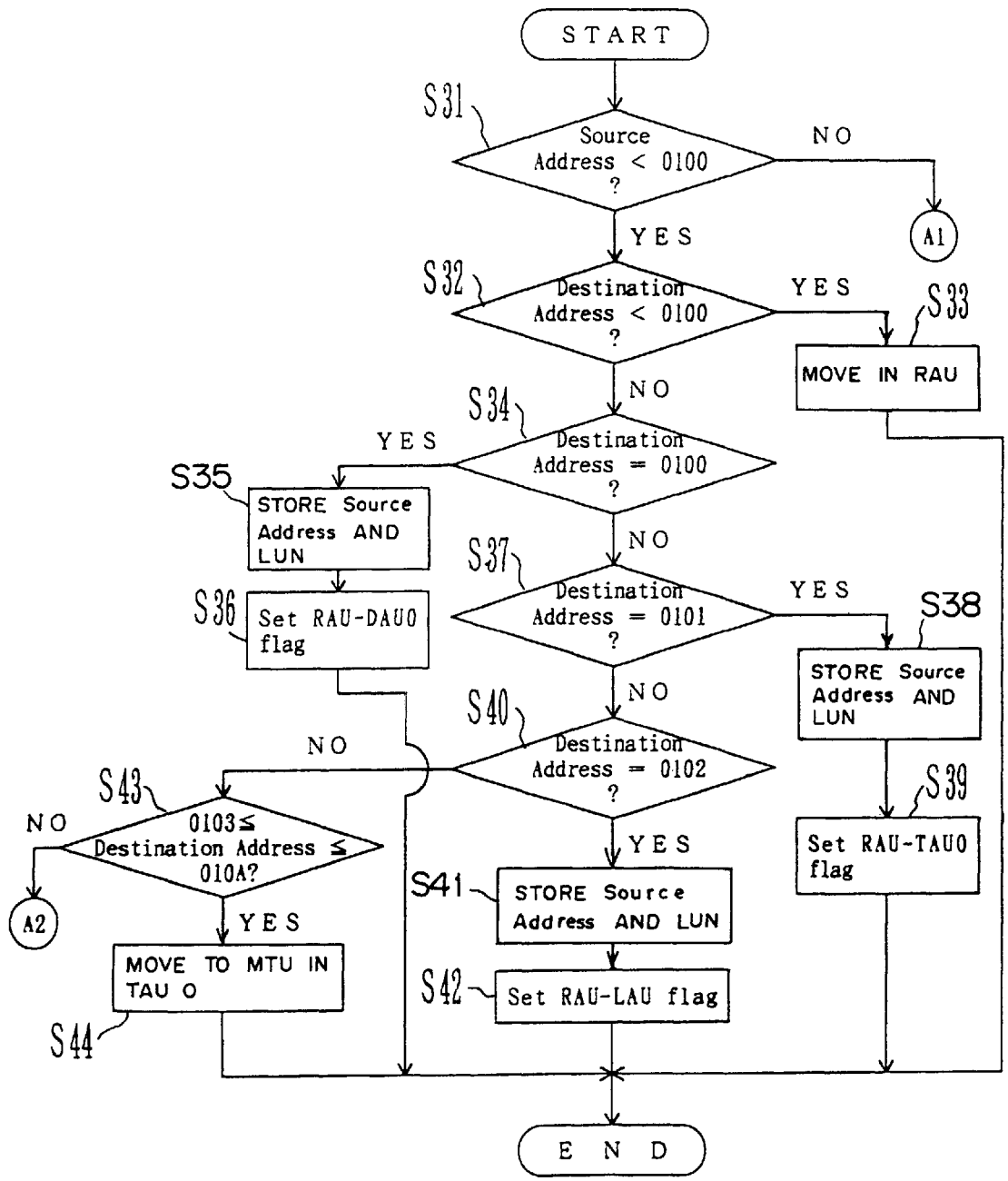
FIG. 14 is a flowchart No.1 of the processing of LUN 0.
Figure 15:
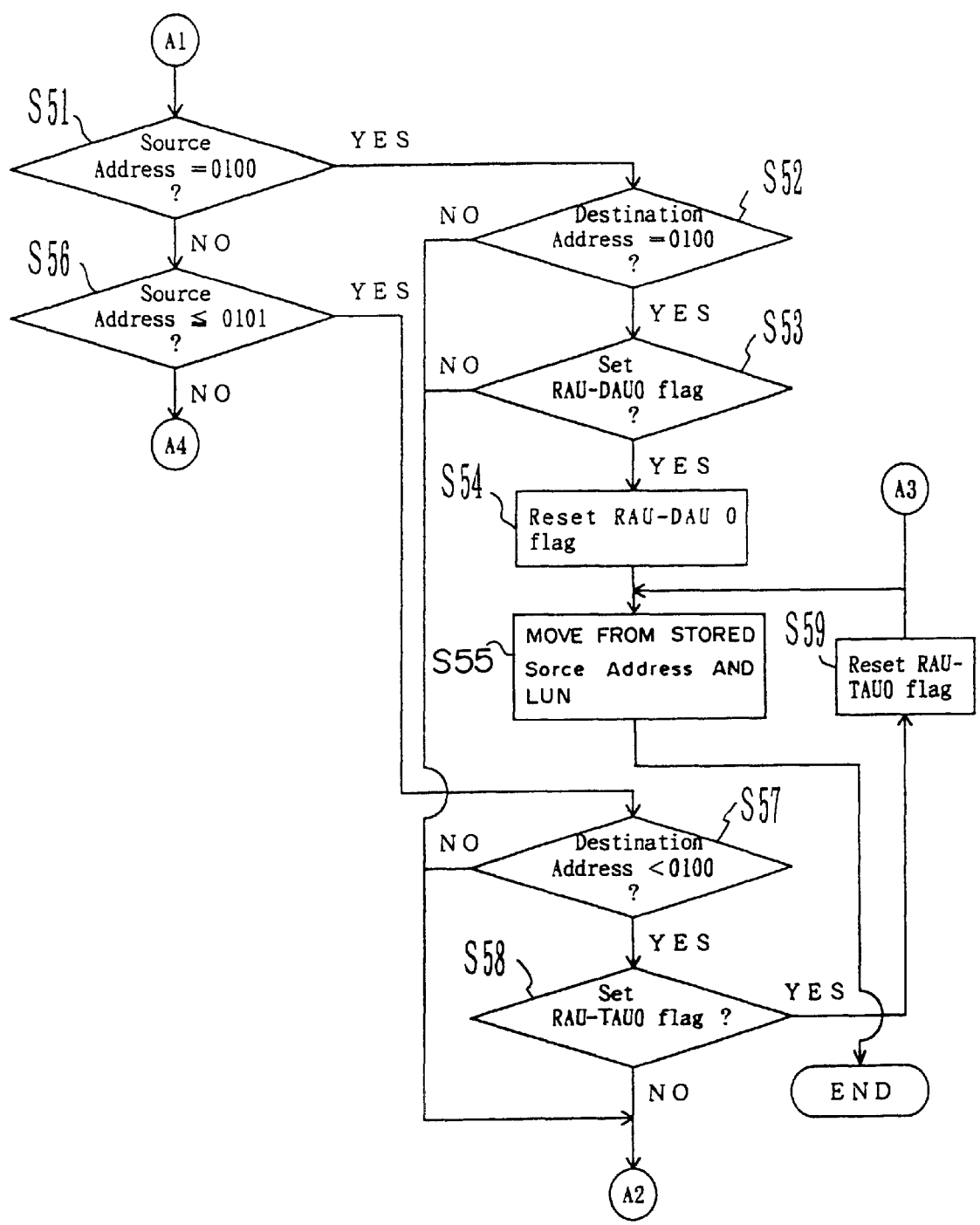
FIG. 15 is a flowchart No.2 of the processing of LUN 0.
Figure 16:
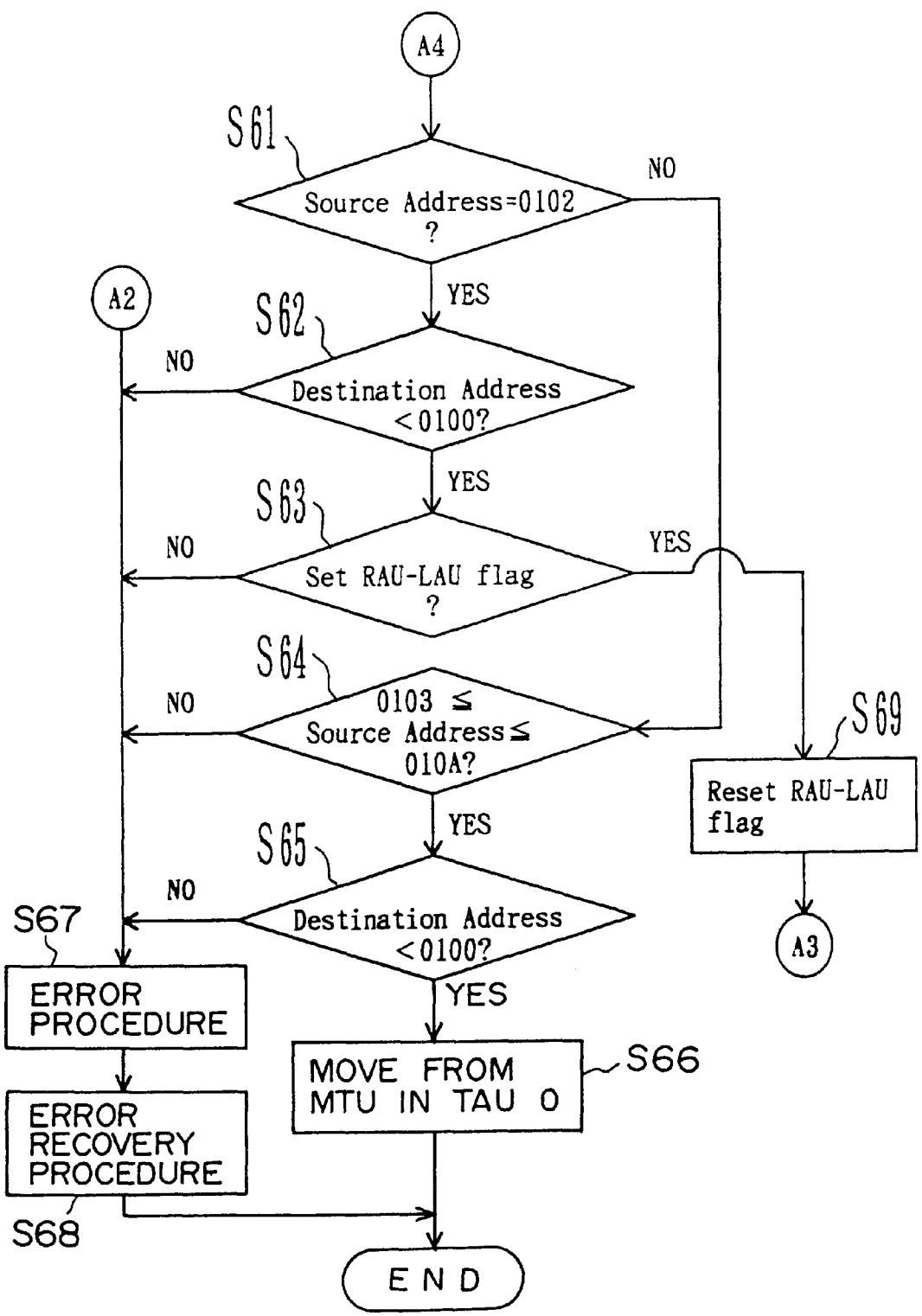
FIG. 16 is a flowchart No.3 of the processing of LUN 0.
Figure 34:
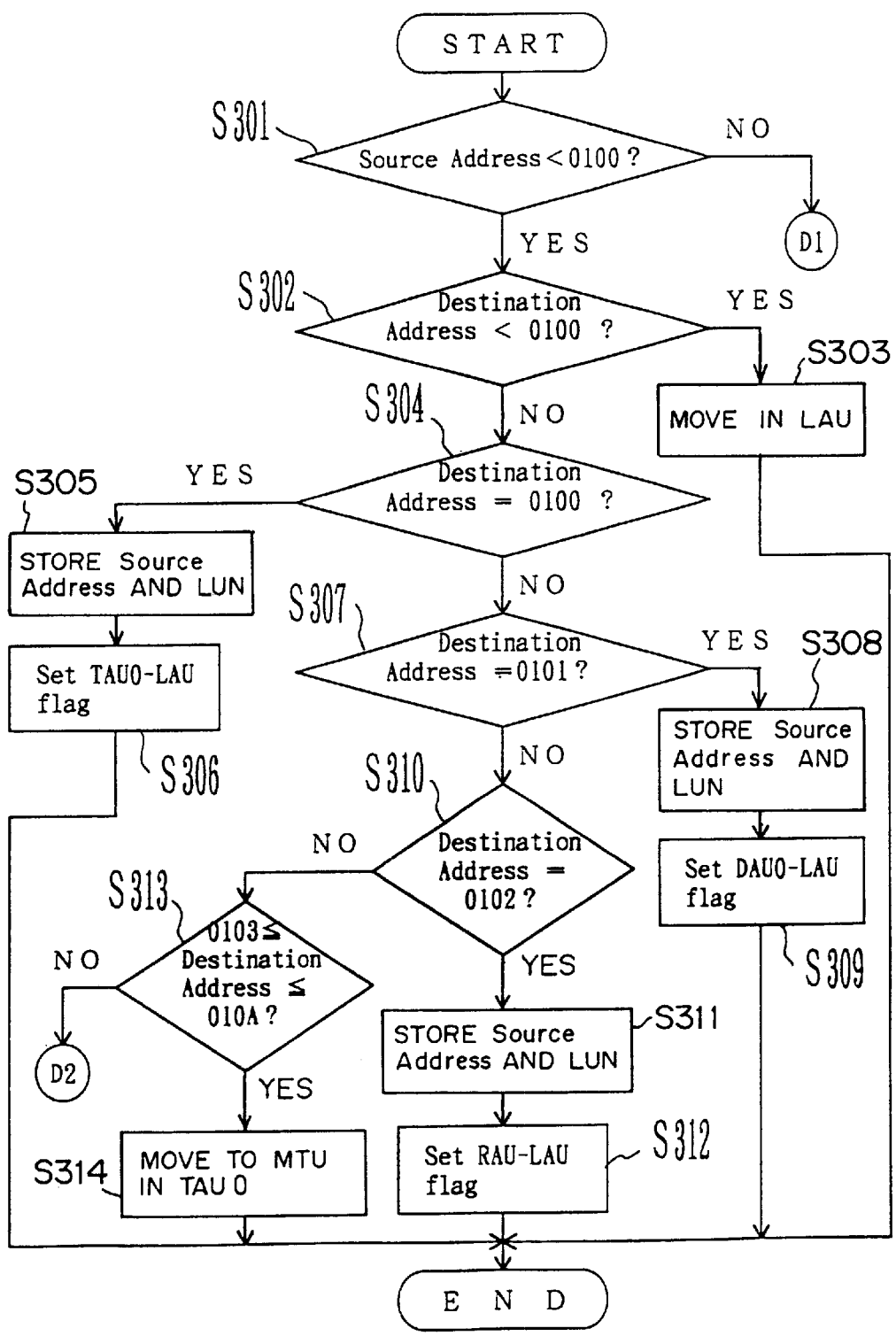
FIG. 34 is a flowchart No.1 of the processing of LUN 3.
Figure 35:
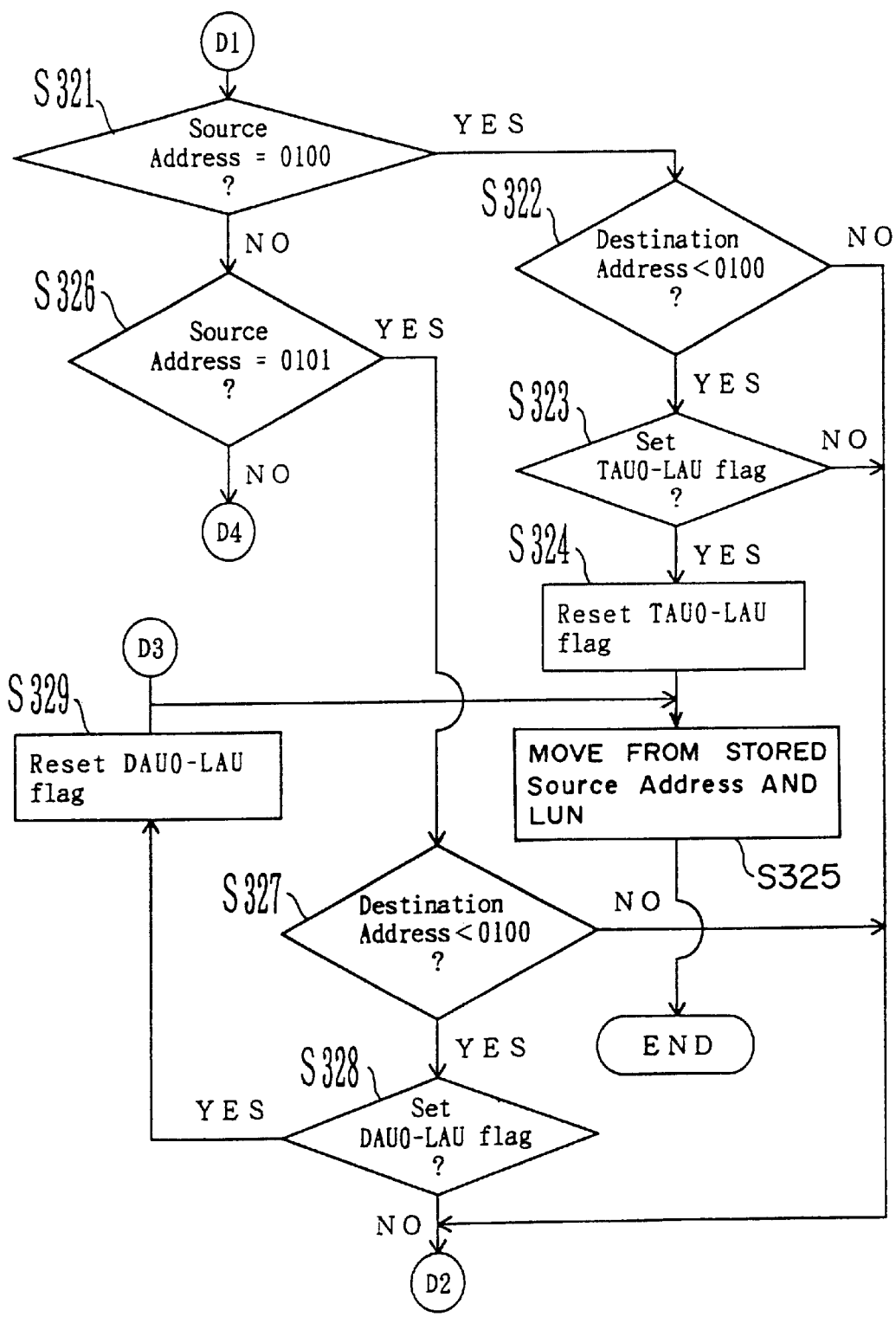
FIG. 35 is a flowchart No.2 of the processing of LUN 3.
Figure 36:
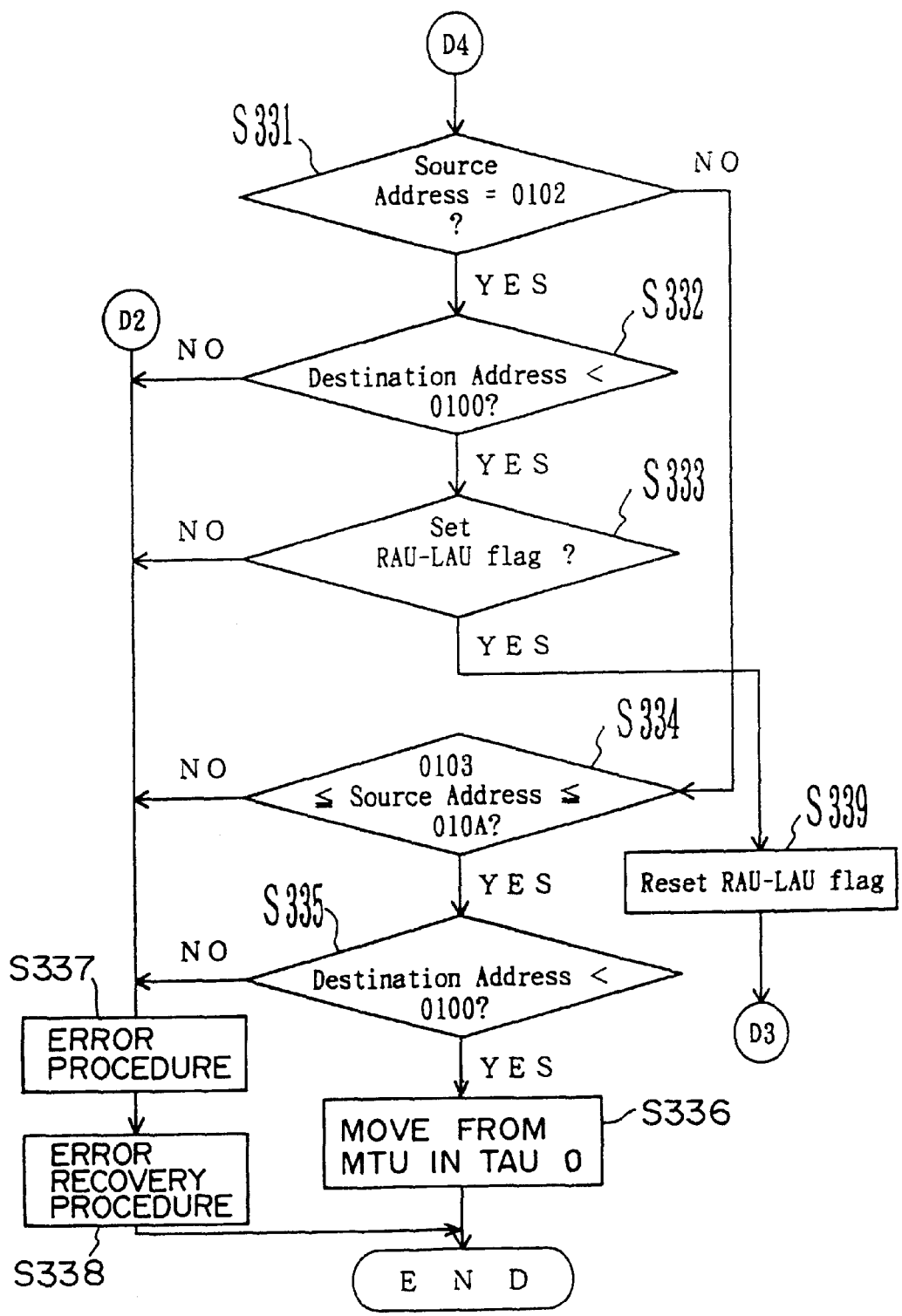
FIG. 36 is a flowchart No.3 of the processing of LUN 3.

FIGS. 14 to 16 show flowcharts of the LUN 0 process in step S15, and FIGS. 17 to 26 are flowcharts of the LUN 1 process in step S18. FIGS. 27 to 33 show flowcharts of the LUN 2 process in step S21, and FIGS. 34 to 36 are flowcharts of the LUN 3 process in step S24., First, an explanation is given of the process for LUN 0. On starting the process, the library controller 1 determines if the source element address of the command is lower than 0100 (FIG. 14, step S31). If the source element address is lower than 0100, it determines if the destination element address is lower than 0100 (step S32). If the destination element address is lower than 0100, the command is restricted to RAU. The recording medium is transferred in RAU(step S33) and the process is terminated.

In step S32, if the destination element address is not lower than 0100, it determines if it is 0100 (step S34). If the destination element address is 0100, this command represents the recording medium transfer from RAU to DAU 0. LUN and the source element address of the command are stored in the control data 'RAU–DAU 0' (step S35), the flag is set (step S36) and the process is terminated.

In step S34, unless the destination element address is 0100, it is compared with the address 0101 (step S37). If the destination element address is 0101, this command represents the recording medium transfer from RAU to TAU 0. LUN and the source element address of the command are stored in the control data 'RAU–TAU 0' (step S38), the flag is set (step S39) and the process is terminated.

In step S37, unless the destination element address is 0101, it is compared with the address 0102 (step S40). If the destination element address is 0102, this command represents the recording medium transfer from RAU to LAU. LUN and the source element address of the command are stored in the control data 'RAU–LAU' (step S41), the flag is set (step S42) and the process is terminated.

In step S40, unless the destination element address is 0102, it is determined if it is not lower than 0103 and not higher than 010A (step S43). If the destination element address is within this range, the destination corresponds to MTU 4 in TAU 0. With reference to the address table in FIG. 11, the recording medium is transferred from RAU to MTU 4 in TAU 0 (step S44) and the process is terminated.

In step S43, if the destination element address is lower than 0103 or higher than 010A, no corresponding address exists in RAU. The same error procedure is executed as in step S25 (FIG. 16, step S67), the error recovery procedure is executed (step S68) and the process is terminated.

In step S31, if the source element address is not lower than 0100, it is determined if it is 0100 (FIG. 15, step S51). If the source element address is 0100, the destination element address is compared with the address 0100 (step S52). If the destination element address is lower than 0100, it is confirmed if the flag of the control data 'RAU–DAU 0' is set (step S53).

If the flag is set, this command represents the recording medium transfer from DAU 0 to RAU. The flag of the control data 'RAU–DAU 0' is reset (step S54), the recording medium is transferred from the source element address in LUN stored in the control data to the destination element address in RAU (step S55) and the process is terminated.

If the destination element address is not lower than 0100 in the step S52 and if the flag is not set in step S53, the command proceeds with the procedure in and after step S67 in FIG. 16.

In step S51, unless the source element address is 0100, it is compared with the address 0101 (step S56). If the source element address is 0101, the destination element address is compared with the address 0100 (step S57). If the destination element address is lower than 0100, it is confirmed if the flag of the control data 'RAU–TAU 0' is set (step S58).

If the flag is set, this command represents the recording medium transfer from TAU 0 to RAU. The flag of the control data 'RAU–TAU 01' is reset (step S59), the recording medium is transferred from the source element address in LUN stored in the control data to the destination element address in RAU (step S55) and the process is terminated.

If the destination element address is not lower than 0100 in step S57 and if the flag is not set in step S58, the command proceeds with the procedure in and after step S67 in FIG. 16.

In step S56, unless the source element address is 0101, it is compared with the address 0102 (FIG. 16, step S61). If the source element address is 0102, the destination element address is compared with the address 0100 (step S62). If the destination element address is lower than 0100, it is confirmed if the flag of the control data 'RAU–LAU' is set (step S63).

If the flag is set, this command represents the recording medium transfer from LAU to RAU. The flag of the control data 'RAU–LAU' is reset (step S69), the recording medium is transferred from the source element address in LUN stored in the control data to the destination element address in RAU (step S55) and the process is terminated.

If the destination element address is not lower than 0100 in step S62 and if the flag is not set in step S63, the command proceeds with the procedure in and after step S67 in FIG. 16.

In step S61, unless the source element address is 0102, it is determined if it is not lower than 0103 and not higher than 010A (step S64). If the source element address is within this range, the source corresponds to MTU 4 in TAU 0.

Then, the destination element address is compared with the address 0100 (step S65). If the destination element address is lower than 0100, the recording medium is transferred from MTU 4 in TAU 0 to RAU with reference to the address table in FIG. 11 (step S66), and the process is terminated. In step S65, if the destination element is not lower than 0100, the command proceeds with the procedure in and after step S67.

In step S64, if the source element address is lower than 0103 or higher than 010A, no corresponding address exists in RAU. The command proceeds with the procedure in and after step S67.

Figure 17:
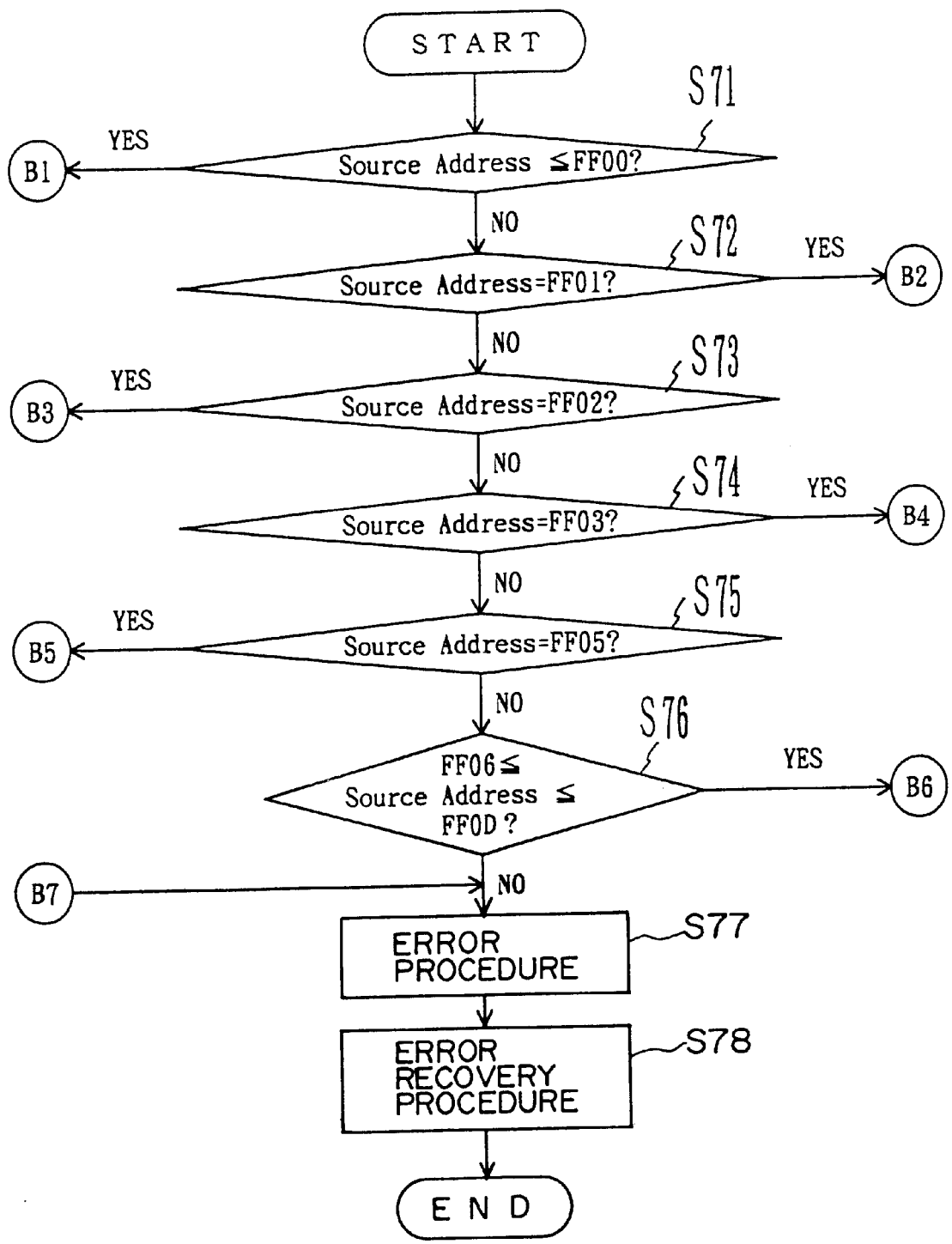
FIG. 17 is a flowchart No.1 of the processing of LUN 1.

An explanation is given of the process in LUN 1. On starting the process, the library controller 1 determines if the source element address of the command is not higher than FF00 (FIG. 17, step S71). If the source element address is not higher than FF00, the command proceeds with the procedure in and after step S81 in FIG. 18. If the source element address is higher than FF00, it is compared with the address FF01 (step S72).

Figure 19:
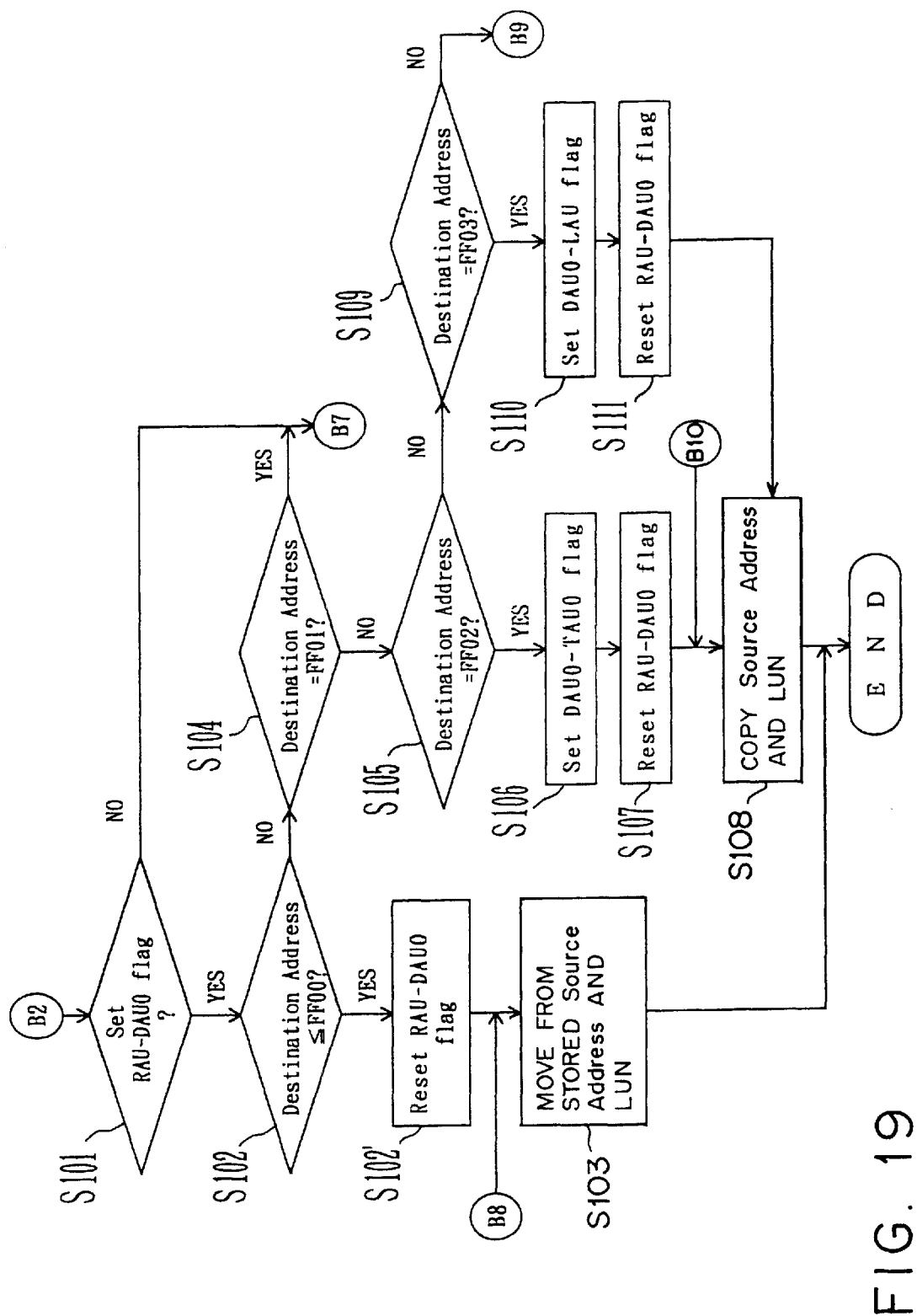
FIG. 19 is a flowchart No.3 of the processing of LUN 1.

If the source element address of the command is FF01, the command proceeds with the procedure in and after step S101 in FIG. 19. Unless it is FF01, it is compared with the address FF02 (step S73). If the source element address is FF02, the command proceeds with the procedure in and after step S131 in FIG. 21. Unless it is FF02, it is compared with FF03 (step S74).

Figure 23:
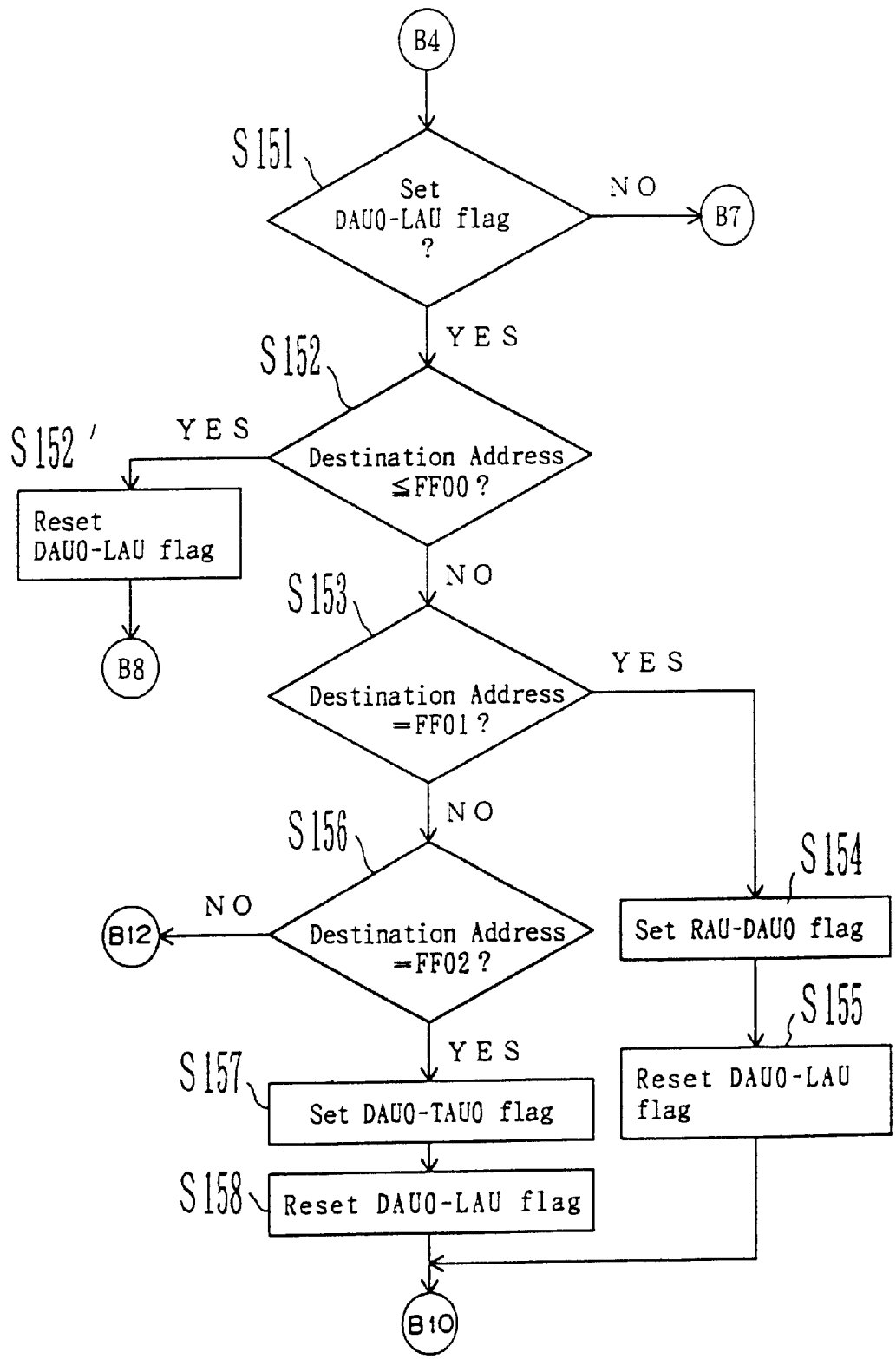
FIG. 23 is a flowchart No.7 of the processing of LUN 1.

If the source element address of the command is FF03, the command proceeds with the procedure in and after step S151 in FIG. 23. Unless it is FF03, it is compared with the address FF05 (step S75). If the source element address is FF05, the command proceeds with the procedure in and after step S171 in FIG. 25. Unless it is FF05, it is determined if it is not lower than FF06 and not higher than FF0D (step S76).

Figure 26:
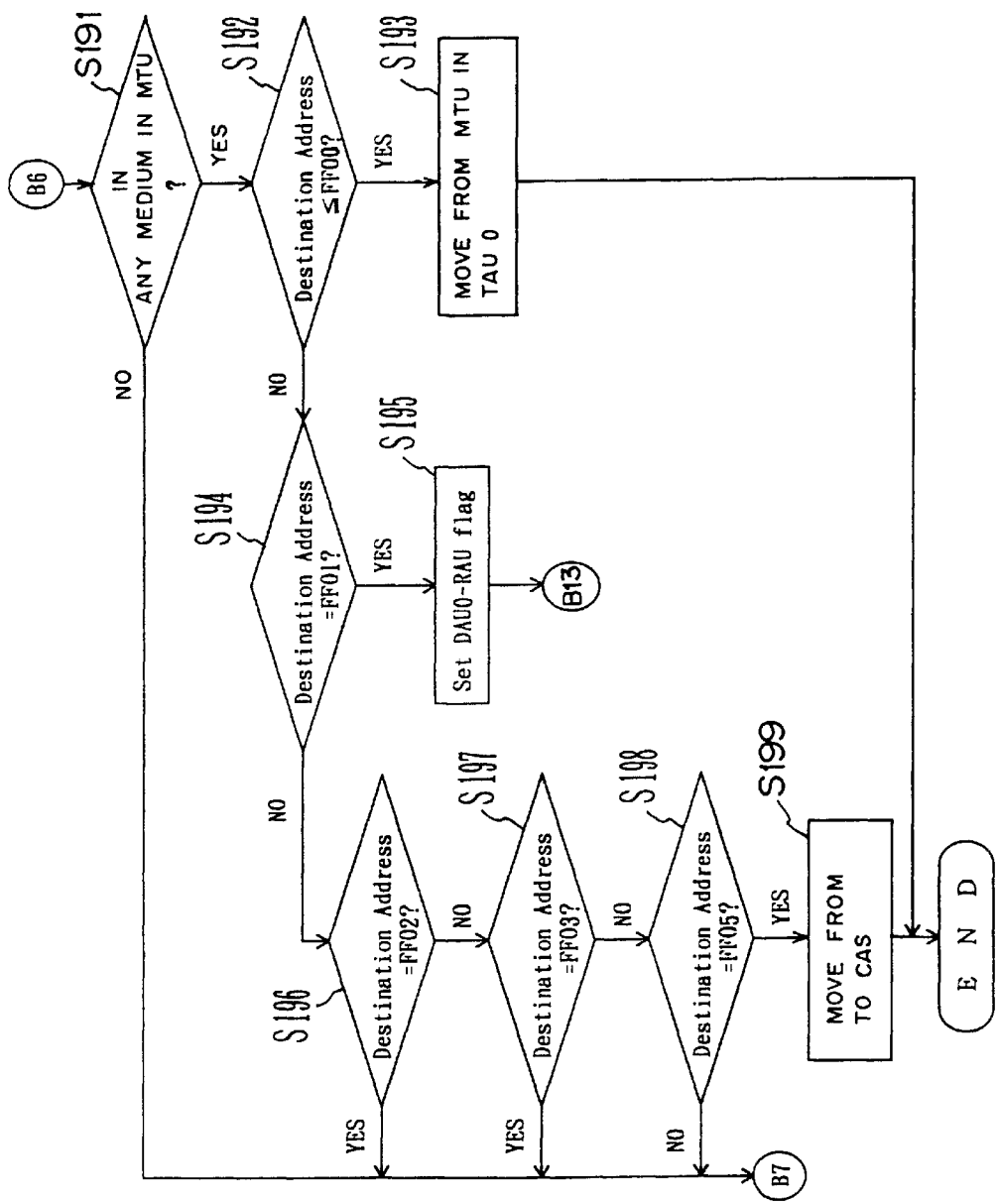
FIG. 26 is a flowchart No.10 of the processing of LUN 1.

If the source element address is within the range, the command proceeds with the procedure in and after step S181 in FIG. 26. If it is lower than FF06 or higher than FF0D, no corresponding address exists in DAU 0. The same error procedure is executed as in LUN 0 (step S77), the error recovery procedure is executed (step S78) and the process is terminated.

Figure 18:
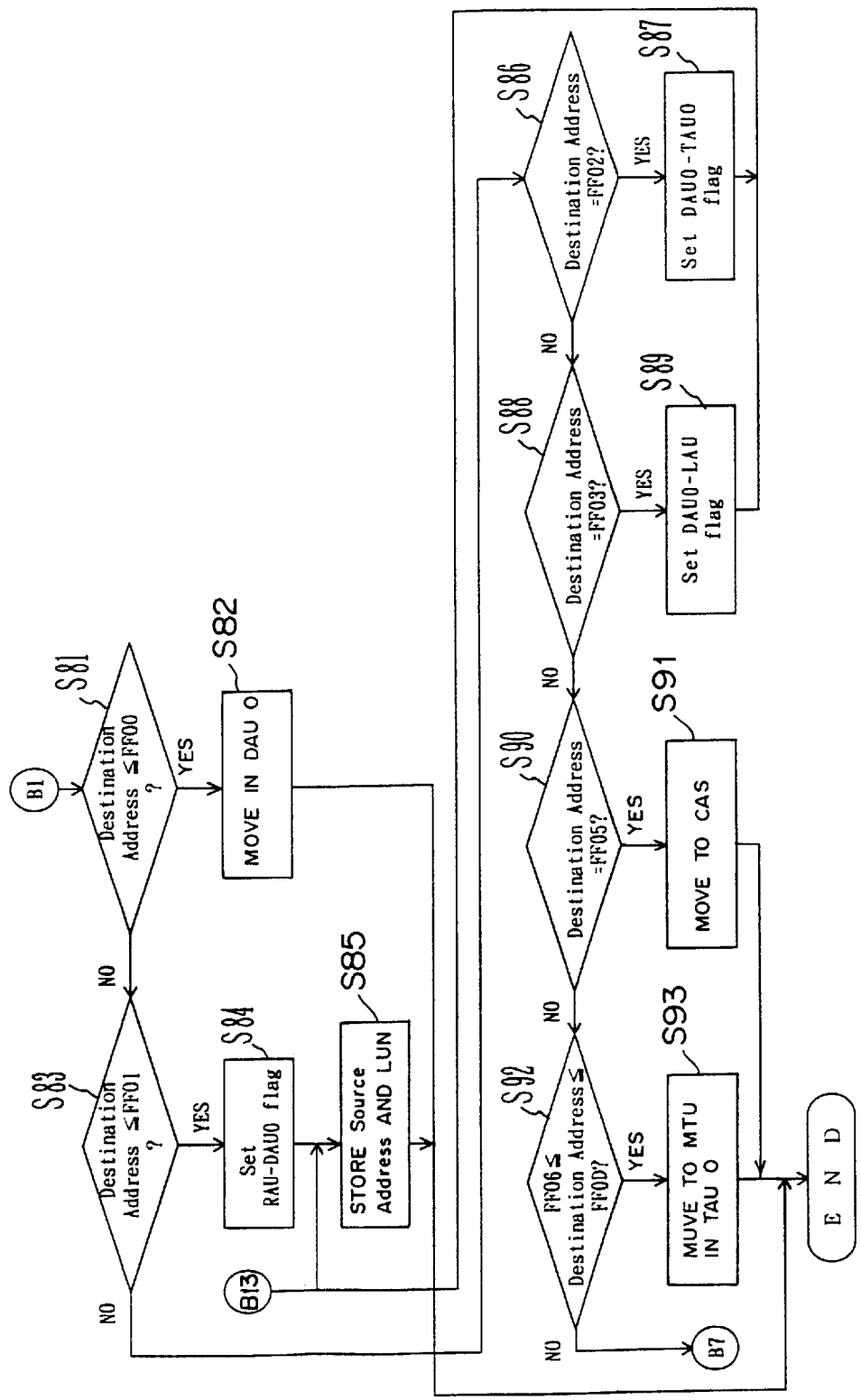
FIG. 18 is a flowchart No.2 of the processing of LUN 1.

In step S71, if the source element address is not higher than FF00, it is determined if the destination address is not higher than FF00 (FIG. 18, step S81). If the destination element address is not higher than FF00, the recording medium is transferred in DAU 0 due to the command being restricted to DAU 0 (step S82) and the process is terminated.

In step S81, if the destination element address is higher than FF00, it determines if it is FF01 (step S83). If the destination element address is FF01, this command represents the recording medium transfer from DAU 0 to RAU. The flag of the control data 'RAU–DAU 0' is set (step S84), LUN and the source element address of the command are stored in the control data 'RAU–DAU 0' (step S85) and the process is terminated.

In step S83, unless the destination element address is FF01, it is compared with the address FF02 (step S86). If the destination element address is FF02, this command represents the recording medium transfer from DAU 0 to TAU 0. The flag of the control data 'DAU 0–TAU 01' is set (step S87), LUN and the source element address of the command are stored in the control data 'DAU 0–TAU 0' (step S87) and the process is terminated.

In step S86, unless the destination element address is FF02, it is compared with the address FF03 (step S88). If the destination element address is FF03, this command represents the recording medium transfer from DAU 0 to LAU. The flag of the control data 'DAU 0–LAU' is set (step S89), LUN and the source element address of the command are stored in the control data 'DAU 0–LAU' (step S85) and the process is terminated.

In step S88, unless the destination element address is FF03, it is compared with the address FF05 (step S90). If the destination element address is FF05, the destination corresponds to CAS 5 in RAU or in LAU. Then, the recording medium is transferred to CAS 5 (step S91) and the process is terminated.

At this point, it depends on the initial setting of the library controller 1 as to which CAS 5 in RAU or LAU is used. For example, the user can preliminarily set the library controller 1 to put a specified CAS 5 into use. Another CAS 5 is automatically used only when the specified CAS 5 is out of order.

A case is considered where any CAS 5 can be applied. In such a case, the library controller 1 determines which ACC 6 in RAU or in LAU should be used for more rapid recording medium transfer, and CAS 5, in a frame which includes the determined ACC 6, is selected.

In step S90, unless the destination element address is FF05, it is determined if the destination element address is not lower than FF06 and not higher than FF0D (step S92). If the destination element address is within this range, the destination corresponds to MTU 4 in TAU 0. Then, with reference to the address table in FIG. 11, the recording medium is transferred from DAU 0 to MTU 4 in TAU 0 (step S93) and the process is terminated.

In step S92, if the destination element address is lower than FF06 or higher than FF0D, no corresponding address exists in DAU 0. Then, the error procedure is executed (step S77), the error recovery procedure is executed (step S78) and the process is terminated.

In step S72, if the source element address is FF01, it is confirmed if the flag of the control data 'RAU–DAU 0' is set (FIG. 19, step S101). Unless the flag is set, the error procedure is executed due to an unidentified source frame (step S77), the error recovery procedure is executed (step S78) and the process is terminated.

If the flag of the control data 'RAU–DAU 0' is set, it is determined if the destination element address is not higher than FF00 (step S102). If the destination element address is not higher than FF00, the destination corresponds to DEE 2 or the cell 7 in DAU 0.

Then, the flag of the control data 'RAU–DAU 0' is reset (step S102'), the recording medium is transferred from the source element address in LUN, stored in the control data, to the destination element address in DAU 0 (step S103) and the process is terminated.

In step S102, if the destination element address is higher than FF00, it is compared with the address FF01 (step S104). If the destination element address is FF01, the error procedure is executed because the address is the same as the source element address (step S77), the error recovery procedure is executed (step S78) and the process is terminated.

Unless the destination element address is FF01, it is compared with the address FF02 (step S105). If the destination element address is FF02, this command represents the recording medium transfer to TAU 0 through DAU 0.

Then, the flag of the control data 'DAU 0–TAU 0' is set (step S106), and the flag of the control data 'RAU–DAU 0' is reset (step S107). LUN and the source element address of the control data 'RAU–DAU 0' are copied to the control data 'DAU 0–TAU 0' (step S108), and the process is terminated.

In step S105, unless the destination element address is FF02, it is compared with the address FF03 (step S109). If the destination element address is FF03, this command represents the recording medium transfer to LAU through DAU 0.

Then, the flag of the control data 'DAU 0–LAU' is set (step S110), and the flag of the control data 'RAU–DAU 0' is reset (step S111). LUN and the source element address of the control data 'RAU–DAU 0' are copied (step S108) and the process is terminated.

Figure 20:
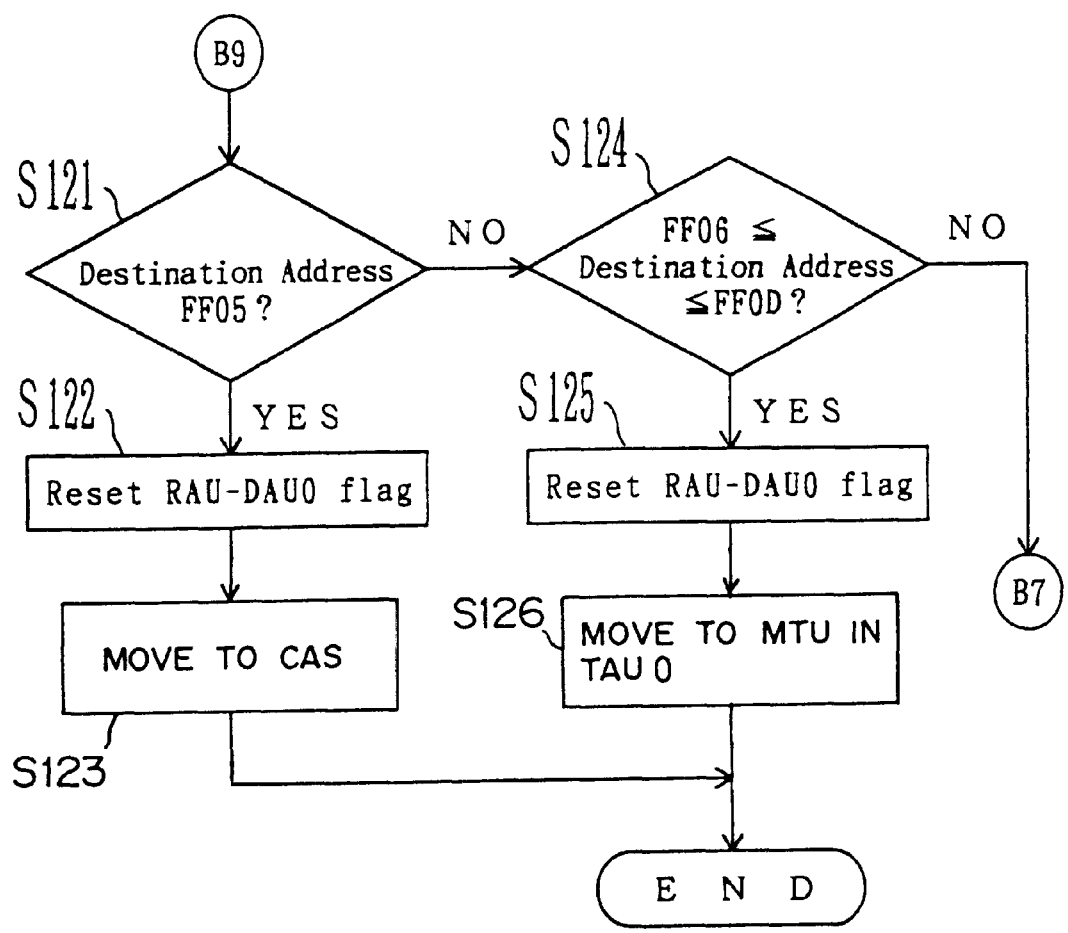
FIG. 20 is a flowchart No.4 of the processing of LUN 1.

In step S109, unless the destination element address is FF03, it is compared with the address FF05 (FIG. 20, step S121). If the destination element address is FF05, this command represents the recording medium transfer to CAS 5 through DAU 0.

Then, the flag of the control data 'RAU–DAU 0' is reset (step S122), the recording medium is transferred from the source element address in LUN of the control data to CAS 5 (step S123), and the process is terminated. At this point, it is determined which CAS 5 in RAU or in LAU is to be used in the same manner as in FIG. 18, step S91.

In step S121, unless the destination element address is FF05, it is determined if it is not lower than FF06 and not higher than FF0D (step S124). If the destination element address remains within this range, the destination corresponds to MTU 4 in TAU 0 through DAU 0.

Then, the flag of the control data 'RAU–DAU 0' is reset (step S125), and with reference to the address table in FIG. 11, the recording medium is transferred from the source element address in LUN of the control data to MTU 4 in TAU 0 (step S126) and the process is terminated.

In step S124, if the destination element address is lower than FF06 or higher than FF0D, no corresponding address exists in DAU 0. The error procedure is executed (step S77), the error recovery procedure is executed (step S78) and the process is terminated.

Figure 21:
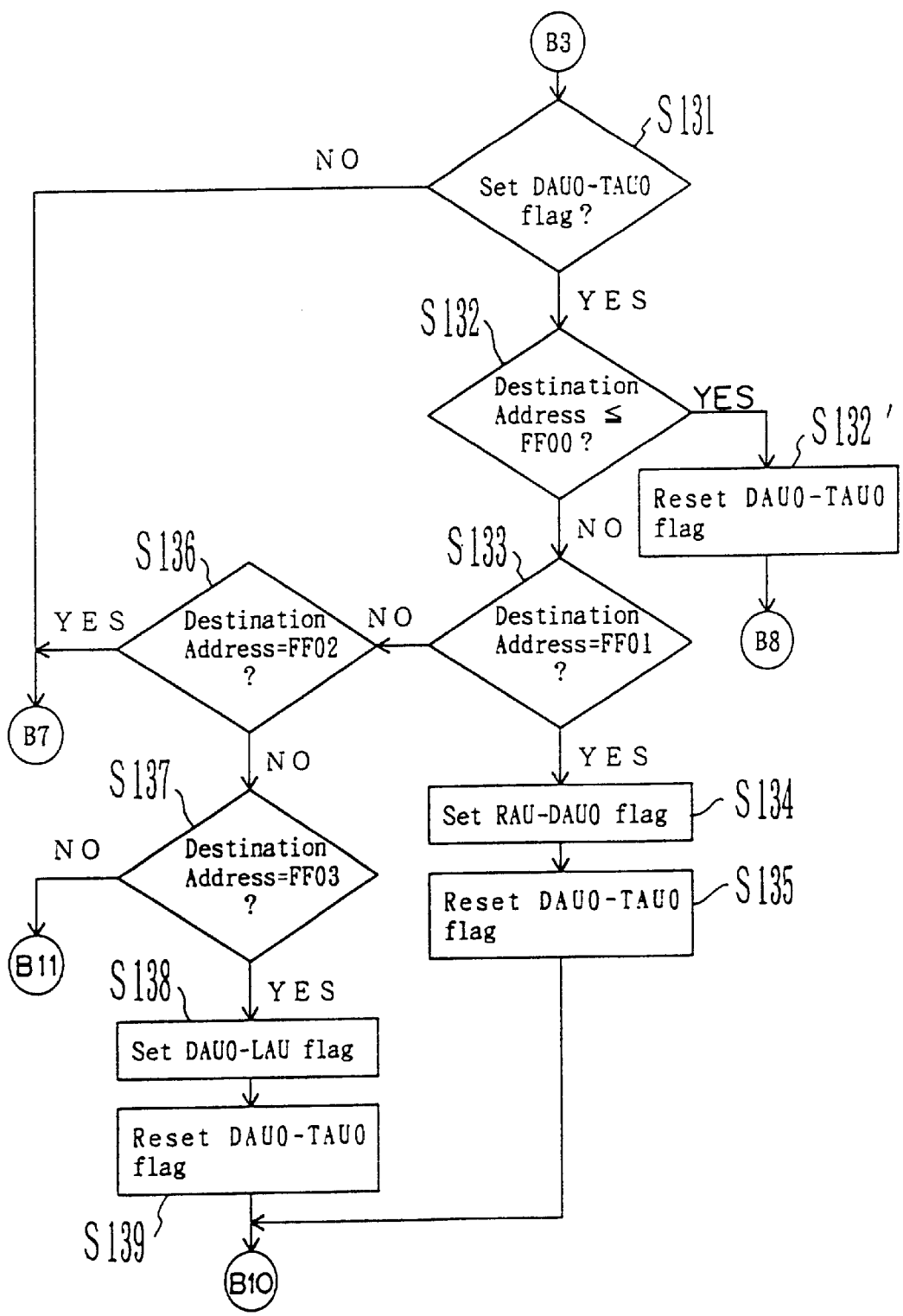
FIG. 21 is a flowchart No.5 of the processing of LUN 1.

In step S73, if the source element address is FF02, it is confirmed if the flag of the control data 'DAU 0–TAU 0' is set (FIG. 21, step S131). Unless the flag is set, the error procedure is executed due to an unidentified source frame (step S77), the error recovery procedure is executed (step S78) and the process is terminated.

If the flag of the control data 'DAU 0–TAU 0' is set, it is determined if the destination element address is not higher than FF00 (step S132). If the destination element address is not higher than FF00, the destination corresponds to DEE 2 or the cell 7 in DAU 0.

Then, the flag of the control data 'DAU 0–TAU 0' is reset (step S132'), and the recording medium is transferred from the source element address in LUN of the control data to the destination element address in DAU 0 (step S103) and the process is terminated.

In step S132, if the destination element address is higher than FF00, it is compared with the address FF01 (step S133). If the destination element address is FF01, this command represents the recording medium transfer to RAU through DAU 0.

Then, the flag of the control data 'RAU–DAU 0' is set (step S134), and the flag of the control data 'DAU 0–TAU 0' is reset (step S135). LUN and the source element address of the control data 'DAU–TAU 0' are copied (step S108) and the process is terminated.

In step S133, unless the destination element address is FF01, it is compared with the address FF02 (step S136). If the destination element address is FF02, the error procedure is executed since it is same as the source element address (step S77), the error recovery procedure is executed (step S78) and the process is terminated.

In step S136, unless the destination element address is FF02, it is compared with the address FF03 (step S137). If the destination element address is FF03, this command represents the recording medium transfer to LAU through DAU 0.

Then, the flag of the control data 'DAU 0–LAU' is set (step S138), and the flag of the control data 'D AU 0–TAU 0' is reset (step S139). LUN and the source element address of the control data 'DAU 0 TAU 0' are copied to the control data 'DAU 0–LAU' (step S108) and the process is terminated.

Figure 22:
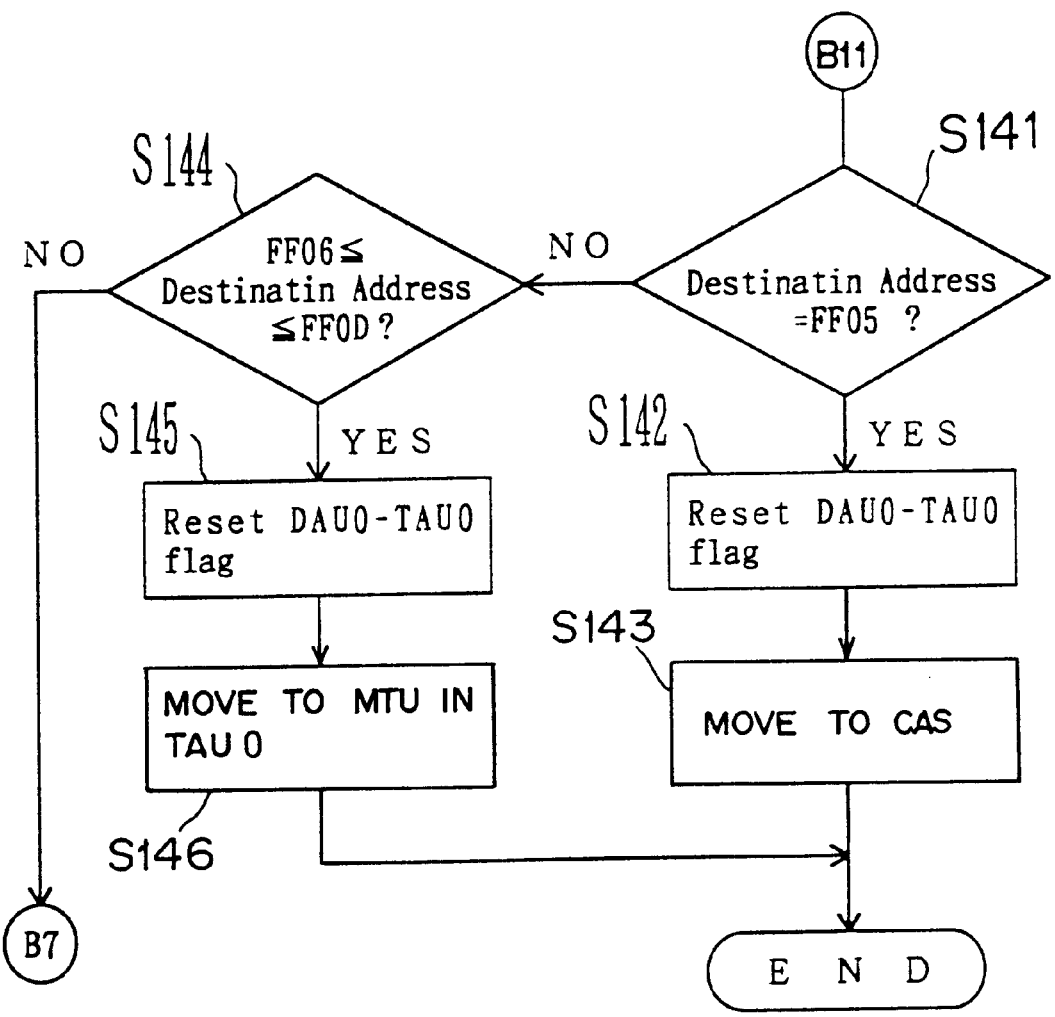
FIG. 22 is a flowchart No.6 of the processing of LUN 1.

In step S137, unless the destination element address is FF03, it is compared with the address FF05 (FIG. 22, step S141). If the destination element address is FF05, this command represents the recording medium transfer to CAS 5 through DAU 0.

The flag of the control data 'DAU 0–TAU 0' is reset (step S142), the recording medium is transferred from the source element address in LUN of the control data to CAS 5 (step S143), and the process is terminated. At this point, it is determined which CAS 5 in RAU or in LAU is to be used in the same manner as in FIG. 18, step S91.

In step S141, unless the destination element address is FF05, it is determined if it is not lower than FF06 and not higher than FF0D (step S144). If the destination element address is within this range, the destination corresponds to MTU 4 in TAU 0 through DAU 0.

Then, the flag of the control data 'DAU–TAU 0' is reset (step S145), and with reference to the address table in FIG. 11, the recording medium is transferred from the source element address in LUN of the control data to MTU 4 in TAU 0 (step S146) and the process is terminated.

In step S144, if the destination element address is lower than FF06 or higher than FF0D, no corresponding address exists in DAU 0. The error procedure is executed (step S77), the error recovery procedure is executed (step S78) and the process is terminated.

In step S74, if the source element address is FF03, it is confirmed if the flag of the control data 'DAU 0–LAU' is set (FIG. 23, step S151). Unless the flag is set, the error procedure is executed due to an unidentified source frame (step S77), the error recovery procedure is executed (step S78) and the process is terminated.

If the flag of the control data 'DAU 0–LAU' is set, it is determined if the destination element address is not higher than FF00 (step S152). If the destination element address is not higher than FF00, the destination corresponds to DEE 2 or the cell 7 in DAU 0.

Then, the flag of the control data 'DAU 0–LAU' is reset (step S152'), the recording medium is transferred from the source element address in LUN of the control data to the destination element address in DAU 0 (step S103) and the process is terminated.

In step S152, if the destination element address is higher than FF00, it is compared with the address FF01 (step S153). If the destination element address is FF01, this command represents the recording medium transfer to RAU through DAU 0.

Then, the flag of the control data 'RAU–DAU 0' is set (step S154), and the flag of the control data 'DAU 0–LAU' is reset (step S155). LUN and the source element address of the control data 'DAU 0–LAU' are copied to the control data 'RAU–DAU 0' (step S108) and the process is terminated.

In step S153, unless the destination element address is FF01, it is compared with the address FF02 (step S156). If the destination element address is FF02, this command represents the recording medium transfer to TAU 0 through DAU 0.

Then, the flag of the control data 'DAU 0–TAU 0' is set (step S157), and the flag of the control data 'DAU 0–LAU' is reset (step S158). LUN and the source element address of the control data 'DAU 0 LAU' are copied to the control data 'DAU 0–TAU 0' (step S108) and the process is terminated.

Figure 24:
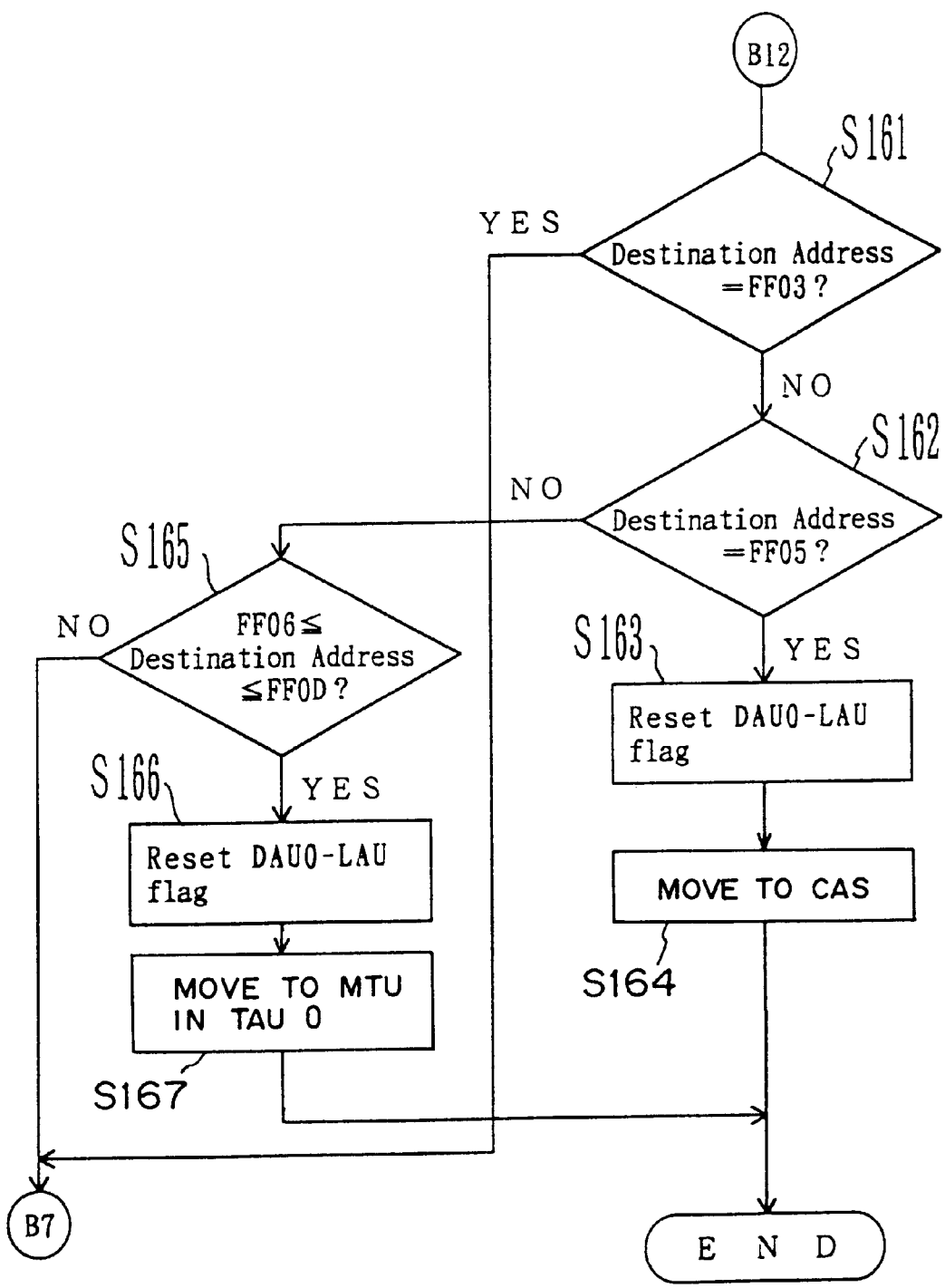
FIG. 24 is a flowchart No.8 of the processing of LUN 1.

In step S156, unless the destination element address is FF02, it is compared-with the address FF03 (FIG. 24, step S161). If the destination element address is FF03, the error procedure is executed since it is same as the source element address (step S77), the error recovery procedure is executed (step S78) and the process is terminated.

In step S161, unless the destination element address is FF03, it is compared with the address FF05 (step S162). If the destination element address is FF05, this command represents the recording medium transfer to CAS 5 through DAU 0.

Then, the flag of the control data 'DAU 0–LAU' is reset (step S163), the recording medium is transferred from the source element address in LUN of the control data to CAS 5 (step S164), and the process is terminated. At this point, it is determined which CAS 5 in RAU or in LAU is to be used, in the same procedure as in FIG. 18, step S91.

In step S162, unless the destination element address is FF05, it is determined if it is not lower than FF06 and not higher than FF0D (step S165). If the destination element address is within this range, the destination corresponds to MTU 4 in TAU 0 through DAU 0.

Then, the flag of the control data 'DAU 0–LAU' is reset (step S166), and with reference to the address table in FIG. 11, the recording medium is transferred from the source element address in LUN of the control data to MTU 4 in TAU 0 (step S167) and the process is terminated.

In step S165, if the destination element address is lower than FF06 or higher than FF0D, no corresponding address exists in DAU 0. The error procedure is executed (step S77), the error recovery procedure is executed (step S78) and the process is terminated.

Figure 25:
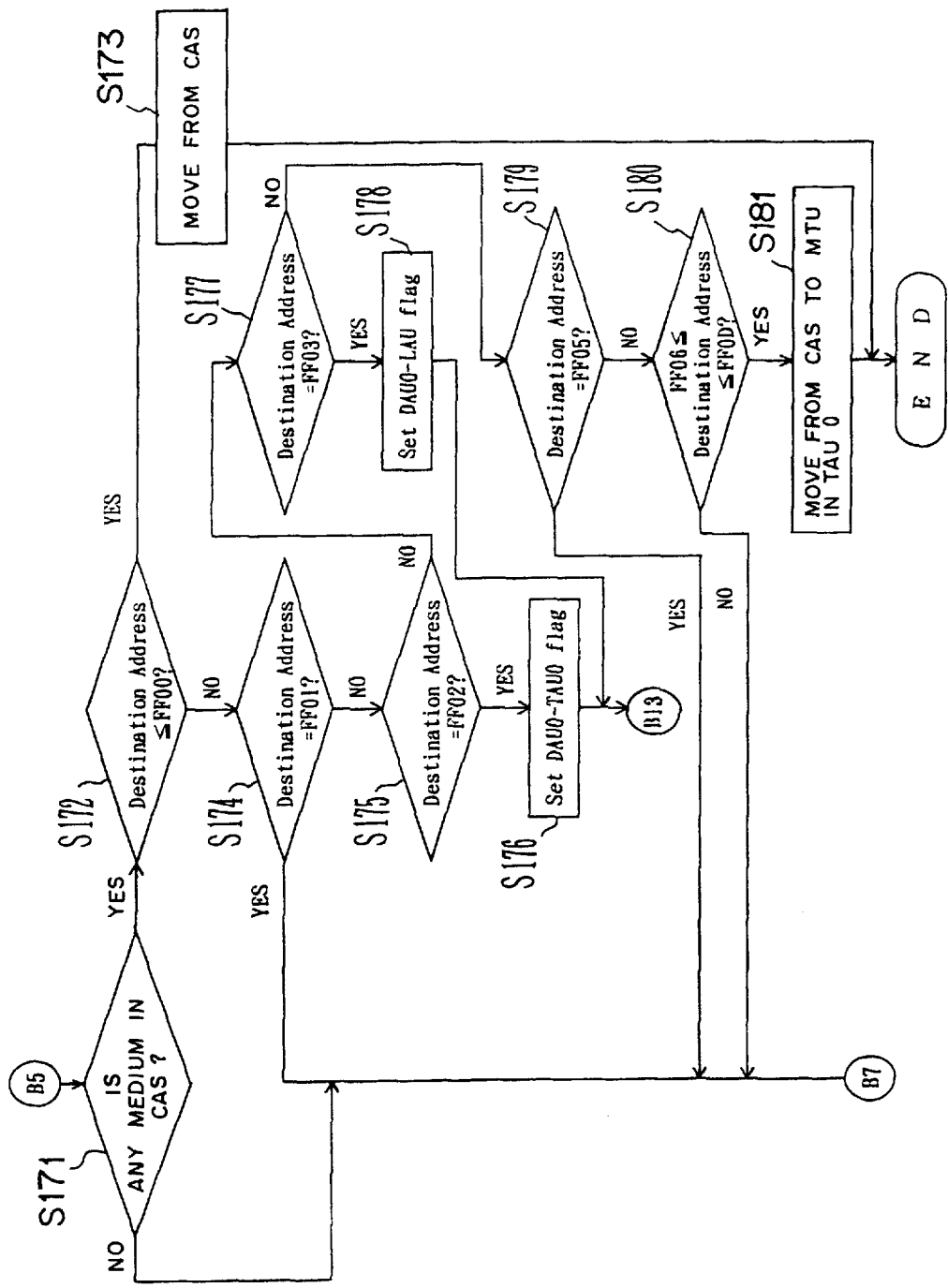
FIG. 25 is a flowchart No.9 of the processing of LUN 1.

In step S75, if the source element address is FF05, it is confirmed which CAS 5 in RAU or in LAU has recording medium, since the source corresponds to the CAS 5 (FIG. 25, step S171). Unless a recording medium exists in a CAS 5, the error procedure is executed (step S77), the error recovery procedure is executed (step S78) and the process is terminated.

If there is a recording medium in a CAS 5, it is determined if the destination element address is not higher than FF05 (step S172). If the destination element address is not higher than FF00, the destination corresponds to DEE 2 or the cell 7 in DAU 0. Therefore, the recording medium is transferred from CAS 5 to the destination element address in DAU 0 (step S173) and the process is terminated.

In step S172, if the destination element address is higher than FF00, it is compared with the address FF01 (step S174). If the destination element address is FF01, the error procedure is executed (step S77), the error recovery procedure is executed (step S78) and the process is terminated.

Unless the destination element address is FF01, it is compared with the address FF02 (step S175). If the destination element address is FF02, the destination corresponds to TAU 0. The flag of the control data 'DAU 0–TAU 0' is set (step S176), LUN and the source element address of CAS 5 are stored in the control data (step S85) and the process is terminated.

In step S175, unless the destination element address is FF02, it is compared with the address FF03 (step S177). If the destination element address is FF03, the destination corresponds to LAU, the flag of the control data 'DAU 0–LAU' is set (step S178), LUN and the source element address of CAS 5 are stored in the control data 'DAU 0–LAU' (step S85) and the process is terminated.

In step S177, unless the destination element address is FF03, it is compared with the address FF05 (step S179). If the destination element address is FF05, the error procedure is executed since it is same as the source element address (step S77), the error recovery procedure is executed (step S78) and the process is terminated.

In step S179, unless the destination element address is FF05, it is determined if it is not lower than FF06 and not higher than FF0D (step S180). If the destination element address is within this range, the destination corresponds to MTU 4 in TAU 0. With reference to the address table in FIG. 11, the recording medium is transferred from CAS 5 to MTU 4 in TAU 0 (step S181) and the process is terminated.

In step S180, if the destination element address is lower than FF06 or higher than FF0D, no corresponding address exists in DAU 0. The error procedure is executed (step S77), the error recovery procedure is executed (step S78) and the process is terminated.

In step S76, if the source element address is not lower than FF06 and not higher than FF0D, the source corresponds to MTU 4 in TAU 0. With reference to the address table in FIG. 11, it is confirmed if the recording medium exists in the corresponding MTU 4 (FIG. 26, step 191). Unless the recording medium exists in MTU 4, the error procedure is executed (step S77), the error recovery procedure is executed (step S78) and the process is terminated.

If the recording medium exists in MTU 4, it is determined if the destination element address is not higher than FF00 (step S192). If the destination element address is not higher than FF00, the destination corresponds to DEE 2 or the cell 7 in DAU 0. Therefore, the recording medium is transferred from MTU 4 to the destination element address in DAU 0 (step S193) and the process is terminated.

In step S192, unless the destination element address is higher than FF00, it is compared with the address FF01 (step S194). If the destination element address is FF01, the flag of the control data 'DAU 0 RAU' is set because the destination corresponds to RAU (step S195), LUN and the source element address of MTU 4 are stored in the control data 'DAU 0–RAU' (step S85) and the process is terminated.

In step S194, unless the destination element address is FF01, it is compared with the address FF02 (step S196). If the destination element address is FF02, the error procedure is executed since it corresponds to the same frame TAU 0 as the source element address (step S77), the error recovery procedure is executed (step S78) and the process is terminated.

In step S196, unless the destination element address is FF02, it is compared with the address FF03 (step S197). If the destination element address is FF03, the error procedure is executed (step S77), the error recovery procedure is executed (step S78) and the process is terminated.

In step S197, unless the destination element address is FF03, it is compared with the address FF05 (step S198). If the destination element address is FF05, the destination corresponds to CAS 5. The recording medium is transferred from MTU 4 to CAS 5 (step S199), and the process is terminated. At this point, the same procedure is executed as in FIG. 18, step S91 to determine which CAS 5 in RAU or in LAU is to be used.

In step S198, unless the destination element address is FF05, the error procedure is executed (step S77), the error recovery procedure is executed (step S78) and the process is terminated.

Figure 27:
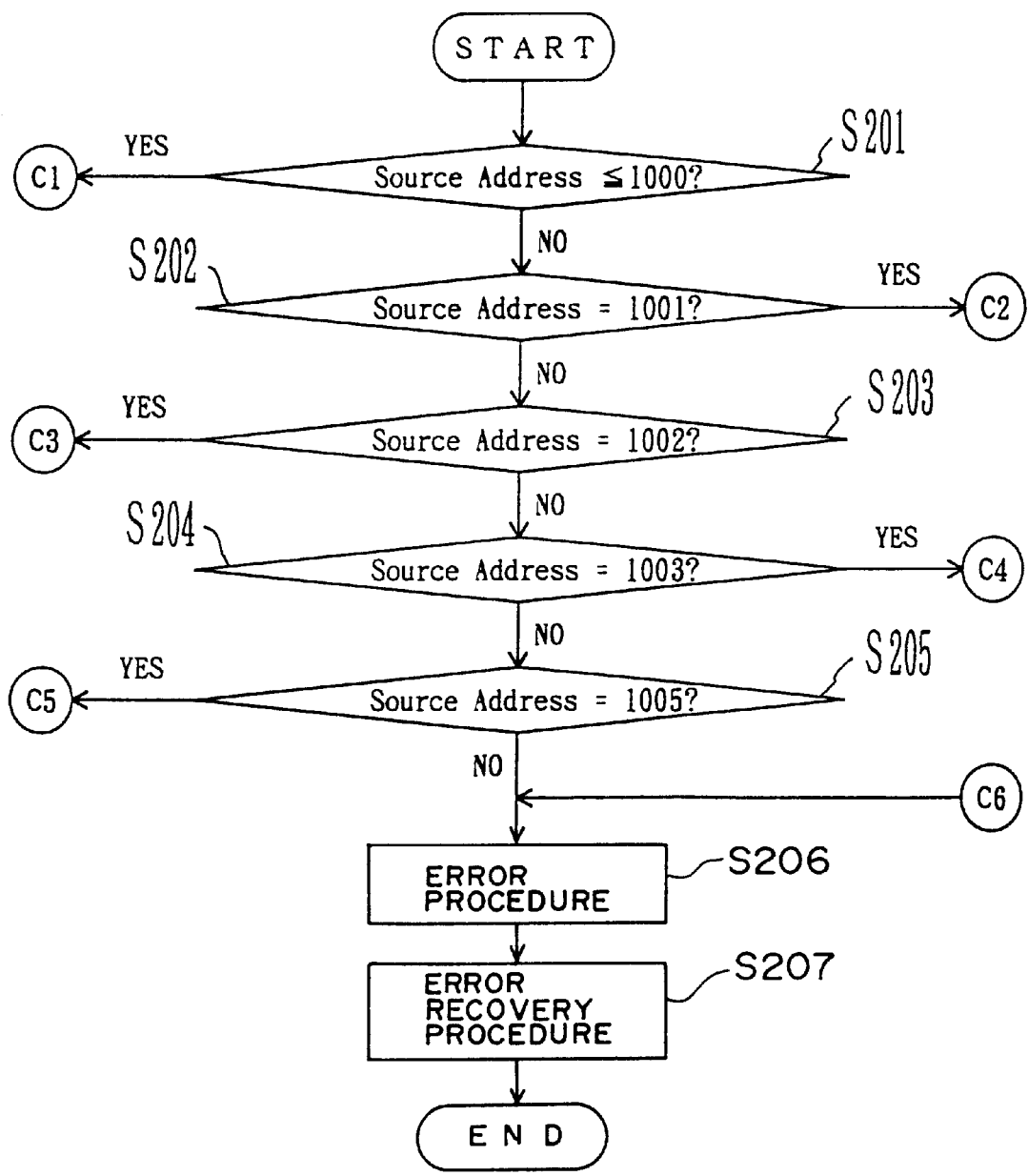
FIG. 27 is a flowchart No.1 of the processing of LUN 2.

Further explanation is now given about the process of LUN 2. On starting the process, the library controller 1 determines if the source element address of the command is not higher than 1000 (FIG. 27, step S201). If the source element address is not higher than 1000, the command proceeds with the procedure in and after step S211 in FIG. 28. If the source element address is higher than 1000, it is compared with the address 1001 (step S202).

Figure 29:
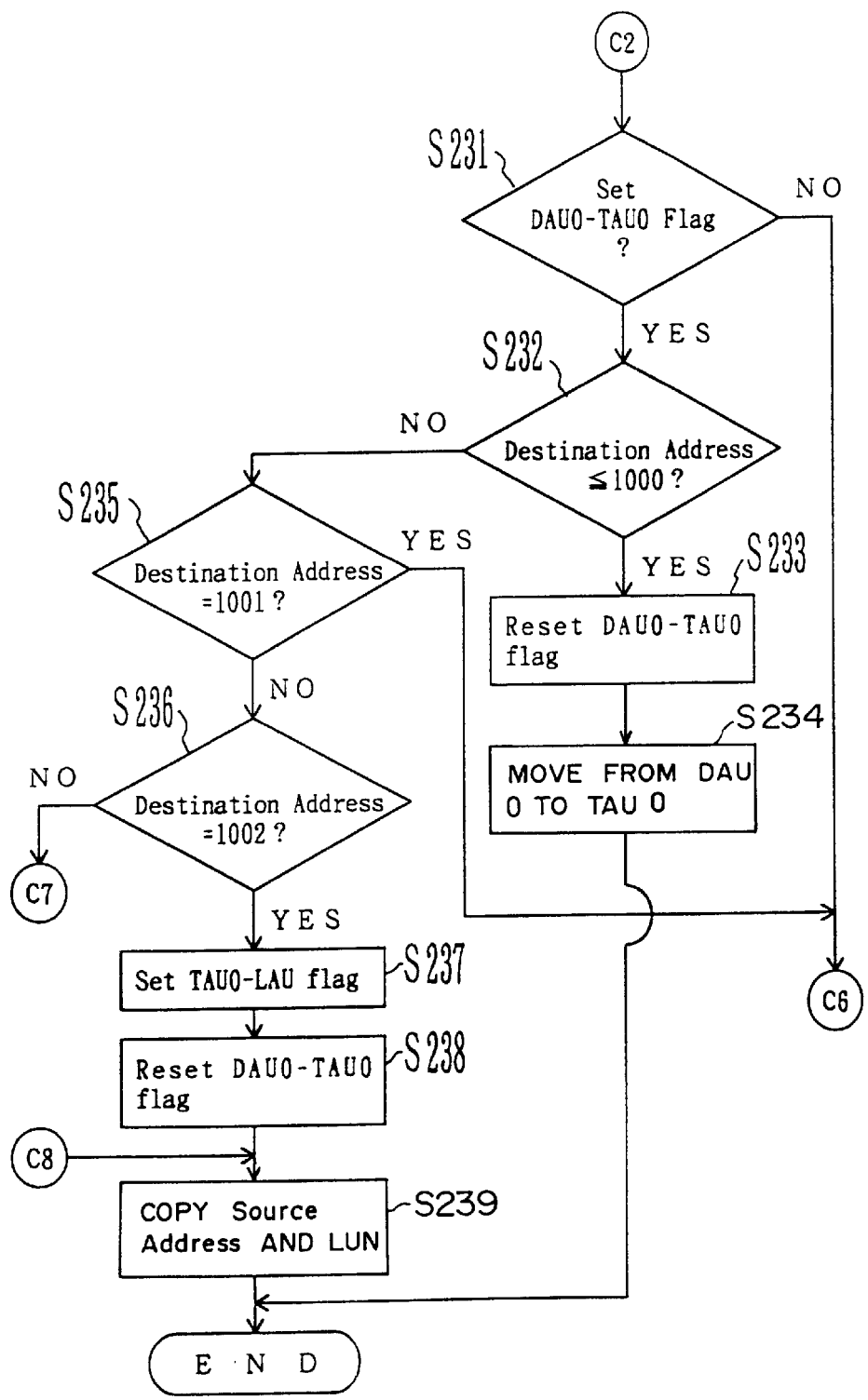
FIG. 29 is a flowchart No.3 of the processing of LUN 2.

If the source element address of the command is 1001, the command proceeds with the procedure in and after step S231 in FIG. 29. Unless it is 1001, it is compared with the address 1002 (step S203). If the source element address is 1002, the command proceeds with the procedure in and after step S251 in FIG. 31. Unless it is 1002, it is compared with 1003 (step S204).

Figure 32:
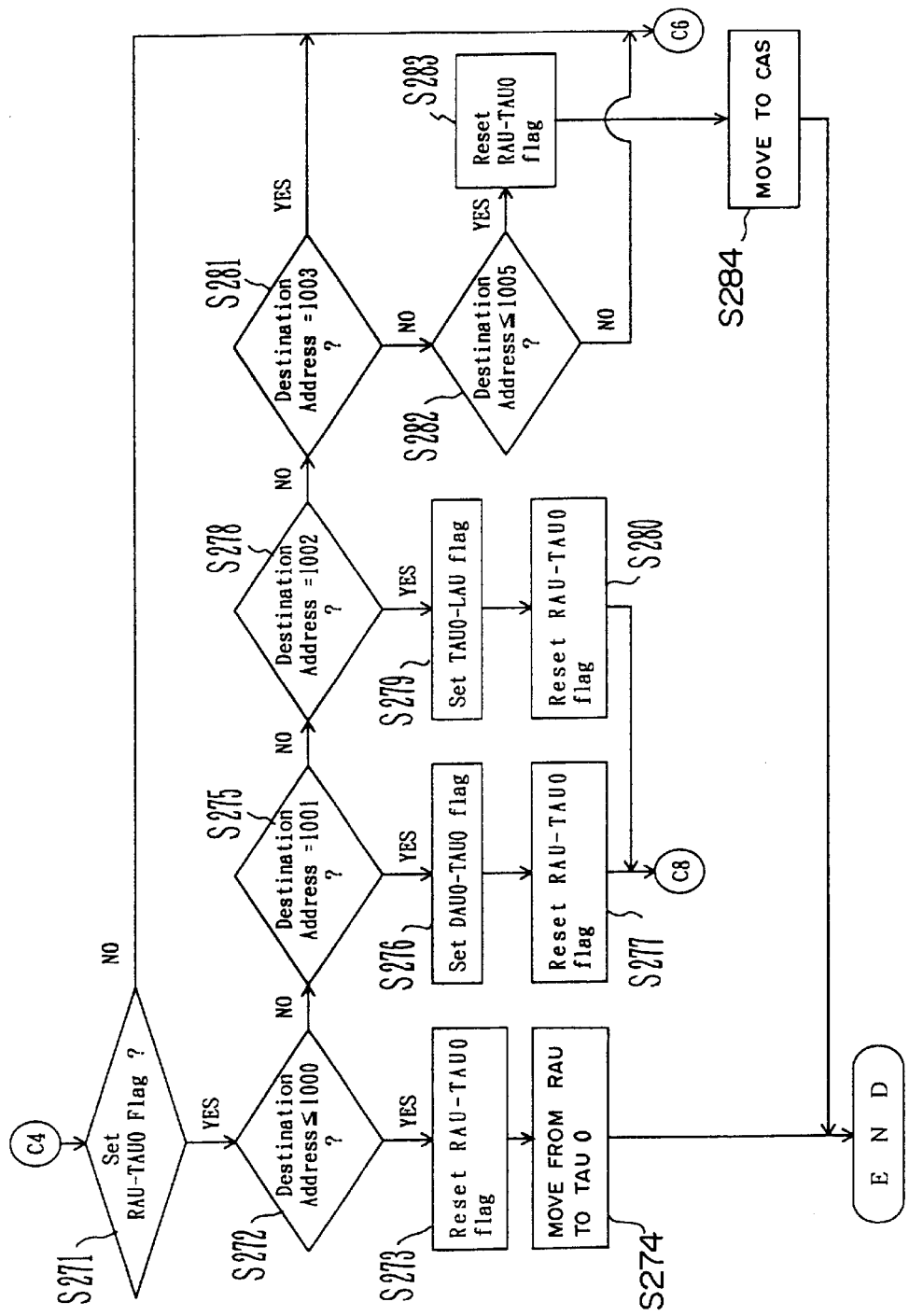
FIG. 32 is a flowchart No.6 of the processing of LUN 2.

If the source element address of the command is 1003, the command proceeds with the procedure in and after step S271 in FIG. 32. Unless it is 1003, it is compared with the address 1005 (step S205). If the source element address is 1005, the command proceeds with the procedure in and after step S291 in FIG. 33. Unless it is 1005, no corresponding address exists in TAU 0. Accordingly, the same error procedure is executed as in LUN 0 (step S206), the error recovery procedure is executed (step S207) and the process is terminated.

Figure 28:
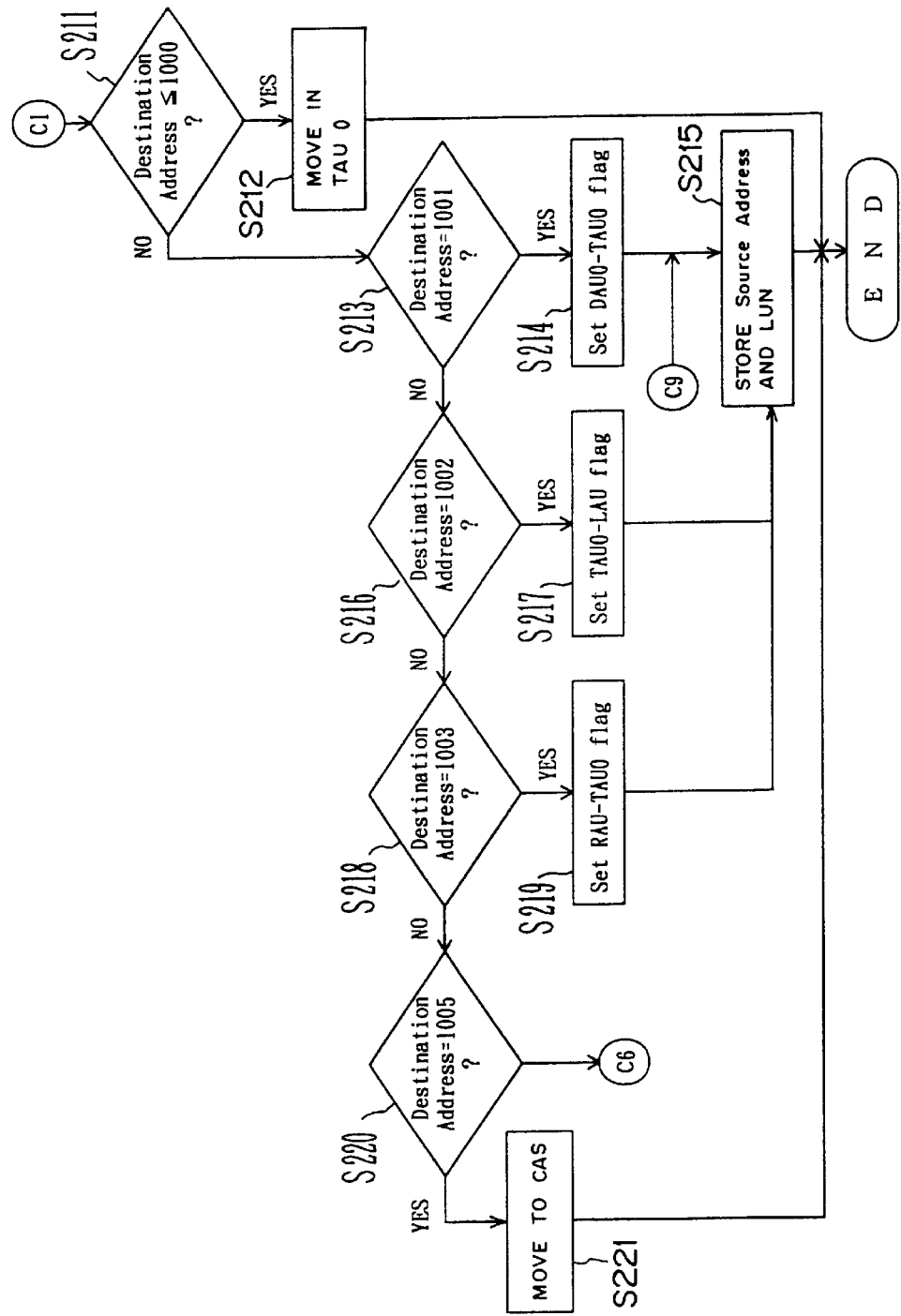
FIG. 28 is a flowchart No.2 of the processing of LUN 2.

In step S201, if the source element address is not higher than 1000, it is determined if the destination address is not higher than 1000 (FIG. 28, step S211). If the destination element address is not higher than 1000, the recording medium is transferred in TAU 0 due to the command being restricted to TAU 0 (step S212) and the process is terminated.

In step S211, if the destination element address is higher than 1000, it is compared with 1001 (step S213). If the destination element address is 1001, this command represents the recording medium transfer from TAU 0 to DAU 0. The flag of the control data 'DAU 0–TAU 0' is set (step S214), LUN and the source element address of the command are stored in the control data 'DAU 0–TAU 0' (step S215) and the process is terminated.

In step S213, unless the destination element address is 1001, it is compared with the address 1002 (step S216). If the destination element address is 1002, this command represents the recording medium transfer from TAU 0 to LAU. The flag of the control data 'TAU 0–LAU' is set (step S217), LUN and the source element address of the command are stored in the control data 'TAU 0–LAU' (step S215) and the process is terminated.

In step S216, unless the destination element address is 1002, it is compared with the address 1003 (step S218). If the destination element address is 1003, this command represents the recording medium transfer from TAU 0 to RAU. The flag of the control data 'RAU–TAU 0' is set (step S219), LUN and the source element address of the command are stored in the control data 'RAU–TAU 0' (step S215) and the process is terminated.

In step S218, unless the destination element address is 1003, it is compared with the address 1005 (step S220). If the destination element address is 1005, the destination corresponds to CAS 5 in RAU or in LAU. Then, the recording medium is transferred to CAS 5 (step S221), and the process is terminated. At this point, the same procedure is executed in FIG. 18, step S91 to determine which CAS 5 in RAU or in LAU is to be used.

In step S220, unless the destination element address is 1005, no corresponding address exists in TAU 0. The error procedure is executed (step S206), the error recovery procedure is executed (step S207) and the process is terminated.

In step S202, if the source element address is 1001, it is confirmed if the flag of the control data 'DAU 0–TAU 0' is set (FIG. 29, step S231). Unless the flag is set, the error procedure is executed due to an unidentified source frame (step S206), the error recovery procedure is executed (step S207) and the process is terminated.

If the flag of the control data 'DAU 0–TAU 0' is set, it is determined if the destination element address is not higher than 1000 (step S232). If the destination element address is not higher than 1000, the destination corresponds to the cell 7 or MTU 4 in TAU 0.

Then, the flag of the control data 'DAU 0–TAU 0' is reset (step S233), the recording medium is transferred from the source element address in LUN, stored in the control data, to the destination element address (step S234) and the process is terminated.

In step S232, if the destination element address is higher than 1000, it is compared with the address 1001 (step S235). If the destination element address is 1001, the error procedure is executed since it is same as the source element address (step S206), the error recovery procedure is executed (step S207) and the process is terminated.

Unless the destination element address is 1001, it is compared with the address 1002 (step S236). If the destination element address is 1002, this command represents the recording medium transfer to LAU through TAU 0.

Then, the flag of the control data 'TAU 0–LAU' is set (step S237), and the flag of the control data 'DAU 0–TAU 0' is reset (step S238). LUN and the source element address of the control data 'DAU 0 TAU 0' are copied to the control data 'TAU 0–LAU' (step S239) and the process is terminated.

Figure 30:
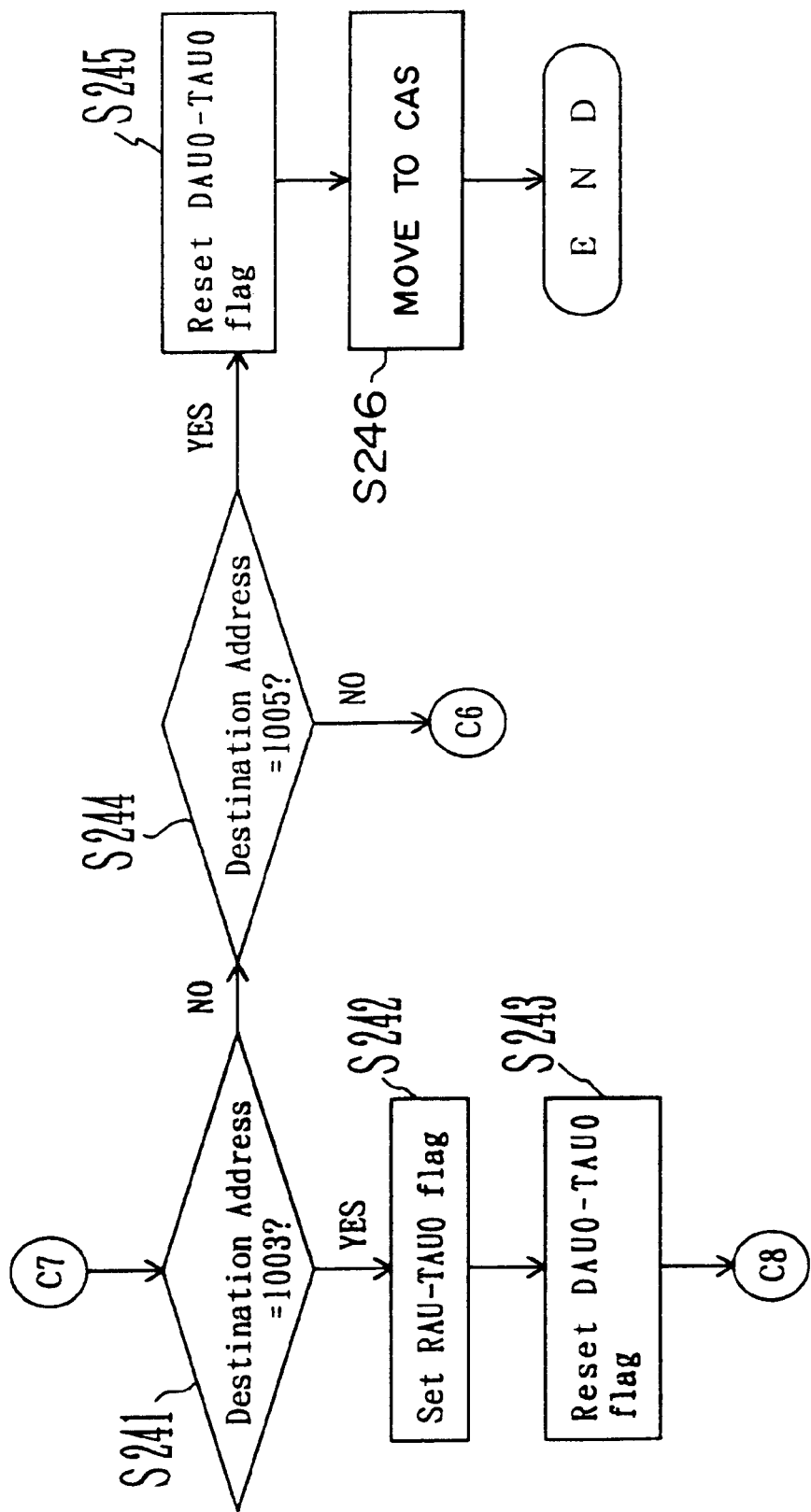
FIG. 30 is a flowchart No.4 of the processing of LUN 2.

In step S236, unless the destination element address is 1002, it is compared with the address 1003 (FIG. 30, step S241). If the destination element address is 1003, this command represents the recording medium transfer to RAU through TAU 0.

Then, the flag of the control data 'RAU–TAU 0' is set (step S242) and the flag of the control data 'DAU 0–TAU 0' is reset (step S243). LUN and the source element address of the control data 'DAU 0–TAU 0' are copied to the control data 'RAU–TAU 0' (step S239) and the process is terminated.

In step S241, unless the destination element address is 1003, it is compared with the address 1005 (step S244). If the destination element address is 1005, this command represents the recording medium transfer to CAS 5 through TAU 0.

Then, the flag of the control data 'DAU 0–TAU 0' is reset (step S245), the recording medium is transferred from the destination element address in LUN of the control data to CAS 5 (step S246) and the process is terminated. At this point, the same procedure as in FIG. 18, step S91 is executed to determine which CAS 5 in RAU or in LAU is to be used.

In step S244, unless the destination element address is 1005, no corresponding address exists in TAU 0. The error procedure is executed (step S206), the error recovery procedure is executed (step S207) and the process is terminated.

Figure 31:
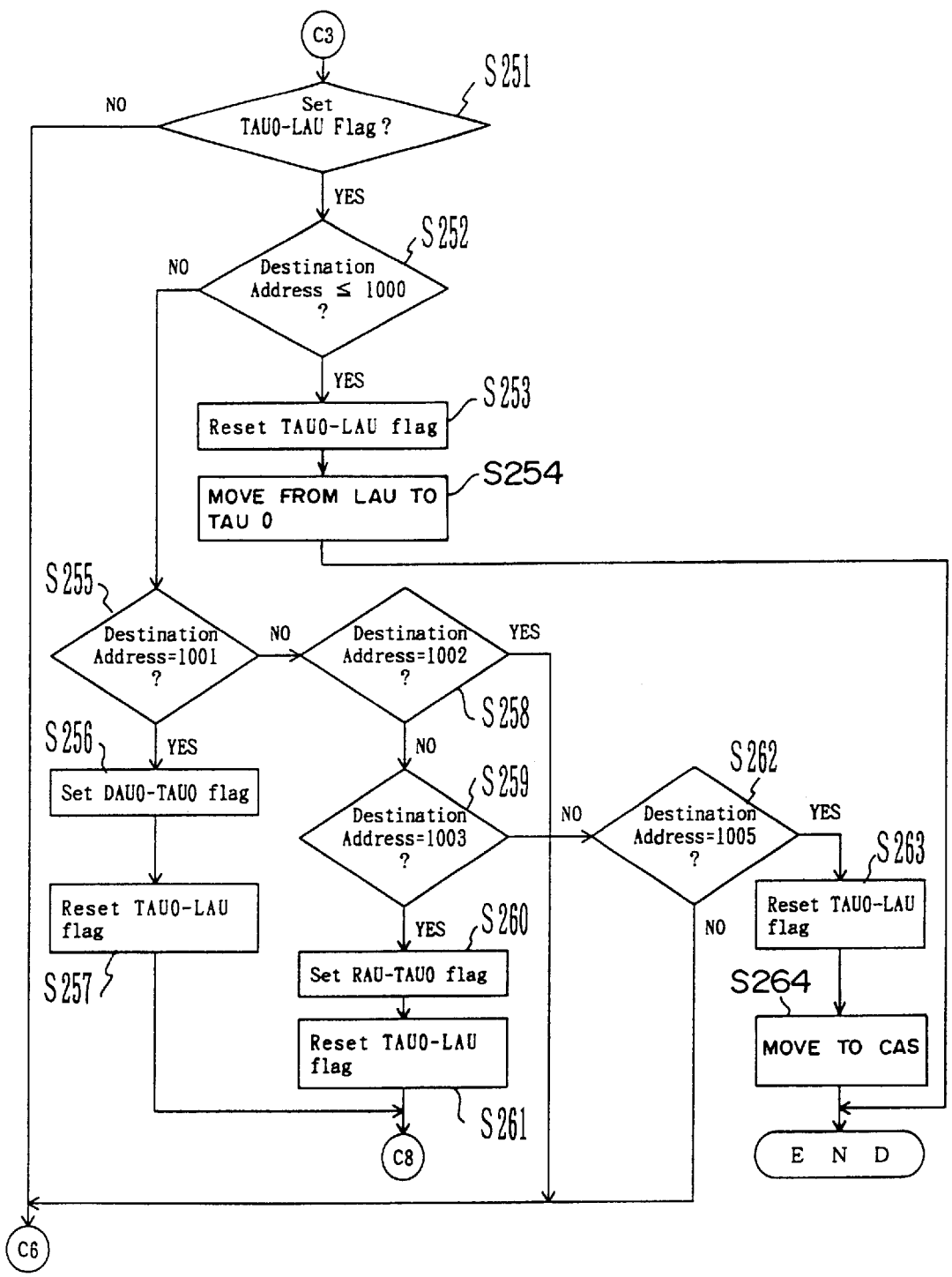
FIG. 31 is a flowchart No.5 of the processing of LUN 2.

In step S203, if the source element address is 1002, it is confirmed if the flag of the control data 'TAU 0–LAU' is set (FIG. 31, step S251). Unless the flag is set, the error procedure is executed due to an unidentified source frame (step S206), the error recovery procedure is executed (step S207) and the process is terminated.

If the flag of the control data 'TAU 0–LAU' is set, it is determined if the destination element address is not higher than 1000 (step S252). If the destination element address is not higher than 100, the destination corresponds to the cell 7 or MTU 4 in TAU 0.

Then, the flag of the control data 'TAU 0–LAU' is reset (step S253), the recording medium is transferred from the source element address in LAU stored in the control data to the destination element address in TAU 0 (step S254) and the process is terminated.

In step S252, if the destination element address is higher than 1000, it is compared with the address 1001 (step S255). If the destination element address is 1001, this command represents the recording medium transfer to DAU 0 through TAU 0.

Then, the flag of the control data 'DAU 0–TAU 0' is set (step S256), and the flag of the control data 'TAU 0–LAU' is reset (step S257). LUN and the source element address of the control data 'TAU 0–LAU' are copied to the control data 'DAU 0–TAU 0' (step S239) and the process is terminated.

In step S255, unless the designation element address is 1001, it is compared with the address 1002 (step S258). If the destination element address is 1002, the error procedure is executed since it is same as the source element address (step S206), the error recovery procedure is executed (step S207) and the process is terminated.

In step S258, unless the destination element address is 1002, it is compared with the address 1003 (step S259). If the destination element address is 1003, this command represents the recording medium transfer to RAU through TAU 0.

Then, the flag of the control data 'RAU–TAU 0' is set (step S260), and the flag of the control data 'TAU 0–LAU' is reset (step S261). LUN and the source element address of the control data 'TAU 0–LAU' are copied to the control data 'RAU–TAU 0' (step S239) and the process is terminated.

In step S259, unless the destination element address is 1003, it is compared with the address 1005 (step S262). If the destination element address is 1005, this command represents the recording medium transfer to CAS 5 through TAU 0.

Then, the flag of the control data 'TAU 0–LAU' is reset (step S263), the recording medium is transferred from the source element address in LUN of the control data to CAS 5 (step S264) and the process is terminated. The same procedure as in FIG. 18 step S91 is executed to determine which CAS 5 in RAU or in LAU is to be used.

In step S262, unless the destination element address is 1005, no corresponding address exists in TAU 0. The error procedure is executed (step S206), the error recovery procedure is executed (step S207) and the process is terminated.

In step S204, if the source element address is 1003, it is confirmed if the flag of the control data 'RAU–TAU 0' is set (FIG. 32, step S271). Unless the flag is set, the error procedure is executed due to an unidentified source address (step S206), the error recovery procedure is executed (step S207) and the process is terminated.

If the flag of the control data 'RAU–TAU 0' is set, it is determined if the destination element address is not higher than 1000 (step S272). If the destination element address is not higher than 1000, the destination corresponds to the cell 7 or MTU 4 in TAU 0.

Then, the flag of the control data 'RAU–TAU 0' is reset (step S273), the recording medium is transferred from the source element address in LUN, stored in the control data, to the destination element address in TAU 0 (step S274) and the process is terminated.

In step S272, if the destination element address is higher than 1000, it is compared with the address 1001 (step S275). If the destination element address is 1001, this command represents the recording medium transfer to DAU 0 through TAU 0.

Then, the flag of the control data 'DAU 0–TAU 0' is set (step S276), and the flag of the control data 'RAU–TAU 0' is reset (step S277). LUN and the source element address of the control data 'RAU–TAU 0' are copied to the control data 'DAU 0–TAU 0' (step S239) and the process is terminated.

In step S275, unless the destination element address is 1001, it is compared with the address 1002 (step S278). If the destination element address is 1002, this command represents the recording medium transfer to LAU through TAU 0.

Then, the flag of the control data 'TAU 0–LAU' is set (step S279), and the flag of the control data 'RAU–TAU 0' is reset (step S280). LUN and the source element address of the control data 'RAU–TAU 0' are copied to the control data 'TAU 0–LAU' (step S239) and the process is terminated.

In step S278, unless the destination element address is 1002, it is compared with the address 1003 (step S281). If the destination element address is 1003, the error procedure is executed since it is same as the source element address (step S206), the error recovery procedure is executed (step S207) and the process is terminated.

In step S281, unless the destination element address is 1003, it is compared with the address 1005 (step S282). If the destination element address is 1003, this command represents the recording medium transfer to CAS 5 through TAU 0.

Then, the flag of the control data 'RAU TAU 0' is reset (step S283), the recording medium is transferred from the source element address in LUN of the control data to CAS 5 (step S284) and the process is terminated. At this time, the same procedure as in FIG. 18 step S91 is executed to determine which CAS 5 in RAU or in LAU is to be used.

In step S282, unless the destination element address is 1005, no corresponding address exists in TAU 0. The error procedure is executed (step S206), the error recovery procedure is executed (step S207) and the process is terminated.

Figure 33:
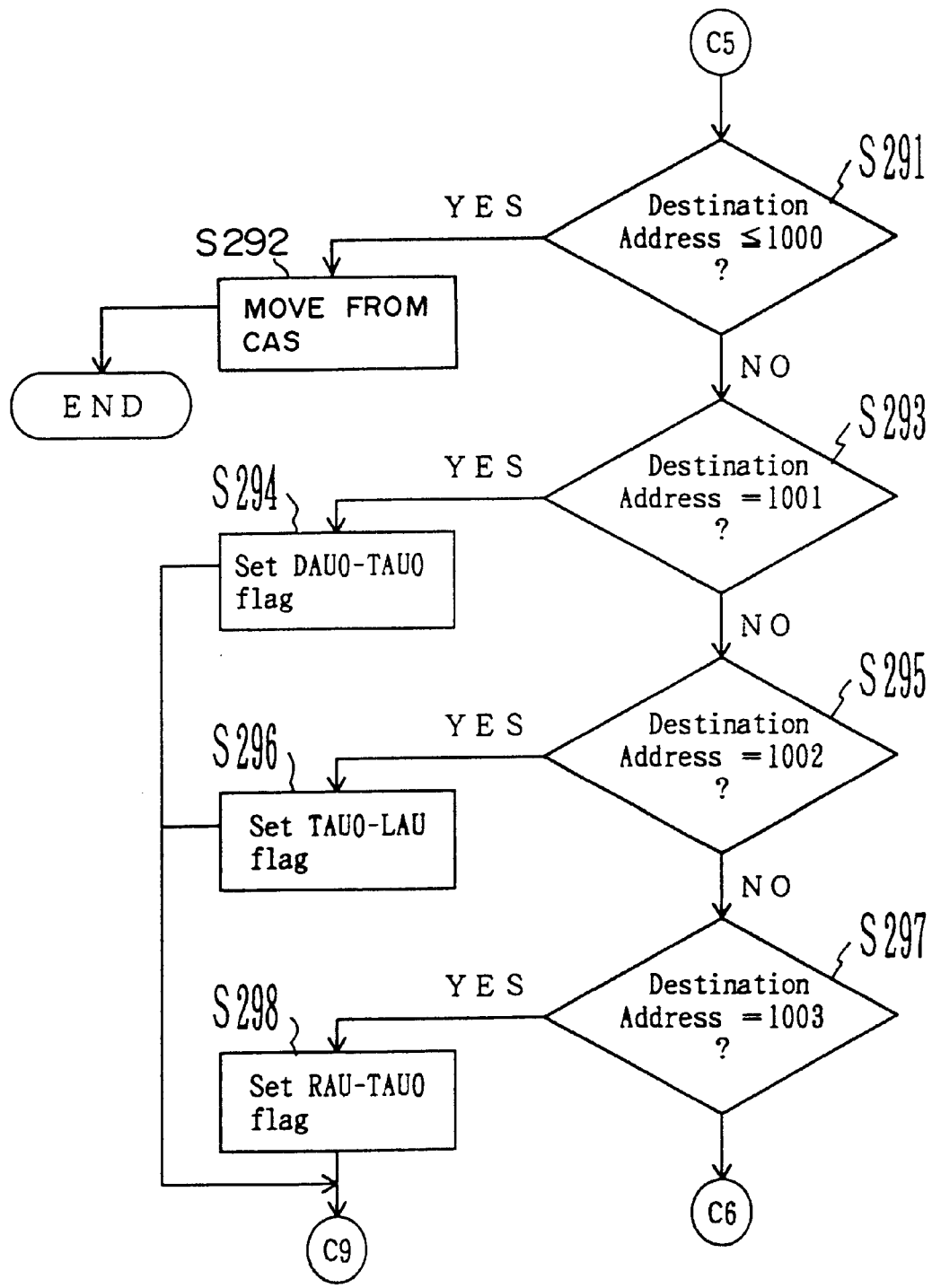
FIG. 33 is a flowchart No.7 of the processing of LUN 2.

In step S205, if the source element address is 1005, it is determined if the destination element address is not higher than 1000 (FIG. 33, step S291). If the destination element address is lower than 1000, the destination corresponds to the cell 7 or MTU 4 in TAU 0. The recording medium is transferred from CAS 5 to the destination element address in DAU 0 (step S292) and the process is terminated.

In step S291, if the destination element address is higher than 1000, it is compared with the address 1001 (step S293). If the destination element address is 1001, the destination corresponds to DAU 0. The flag of the control data 'DAU 0–TAU 0' is set (step S294), LUN and the source element address of CAS 5 are stored in the control data (step S215) and the process is terminated.

In step S293, unless the destination element address is 1001, it is compared with the address 1002 (step S295). If the destination element address is 1002, the destination corresponds to LAU. The flag of the control data 'TAU 0–LAU' is set (step S296), LUN and the source element address of CAS 5 are stored in the control data (step S215) and the process is terminated.

In step S295, unless the destination element address is 1002, it is compared with the address 1003 (step S297). If the destination element address is 1003, the destination corresponds to RAU. The flag of the control data 'RAU–TAU 0' is set (step S298), LUN and the source element address of CAS 5 are stored in the control data (step S215) and the process is terminated.

In step S297, unless the destination element address is 1003, the error procedure is executed (step S206), the error recovery procedure is executed (step S207) and the process is terminated.

An explanation is now given of the process in LUN 3. The process in LUN 3 is basically similar to the process in LUN 0. On starting the process, the library controller 1 initially determines if the source element address of the command is lower than 0100 (FIG. 34, step S301). If the source element address is lower than 0100, it is determined if the destination element address is lower than 0100 (step S302). If the destination element address is lower than 0100, the recording medium is transferred in LAU due to the command being restricted to LAU (step S303) and the process is terminated.

In step S302, if the destination element address is not lower than 0100, it is determined if it is 0100 (step S304). If the destination element address is 0100, this command represents the recording medium transfer from LAU to TAU 0. LUN and the source element address of the command are stored in the control data 'TAU 0–LAU' (step S305), the flag is set (step S306) and the process is terminated.

In step S304, unless the destination element address is 0100, it is compared with the address 0101 (step S307). If the destination element address is 0101, this command represents the recording medium transfer from LAU to DAU 0. Then, LAU and the source element address of the command are stored in the control data 'DAU 0–TAU' (step S308), the flag of the control data is set (step S309) and the process is terminated.

In step S307, unless the destination element address is 0101, it is compared with the address 0102 (step S310). If the destination element address is 0102, this command represents the recording medium transfer from LAU to RAU. LUN and the source element address of the command are stored in the control data 'RAU–LAU' (step S311), the flag of the control data is set (step S312) and the process is terminated.

In step S310, unless the destination element address is 0102, it is determined if it is not lower than 0103 and not higher than 0010A (step S313). With case the destination element address is within this range, the destination corresponds to MTU 4 in TAU 0. With reference to the address table in FIG. 11, the recording medium is transferred from LAU to MTU 4 in TAU 0 (step S314) and the process is terminated.

In step S313, if the destination element address is lower than 0103 or higher than 010A, no corresponding address exists in LAU 0. The same error procedure as in LUN 0 is executed (FIG. 36, step S337), the error recovery procedure is executed (step S338) and the process is terminated.

In step S301, if the source element address is not lower than 0100, it is determined if it is 0100 (FIG. 35, step S321). If the source element address is 0100, the destination element address is compared with the address 0100 (step S322). If the destination element address is lower than 0100, it is confirmed if the flag of the control data 'TAU 0–LAU' is set (step S323).

If the flag is set, this command represents the recording medium transfer from TAU 0 to LAU. The flag of the control data 'TAU 0–LAU' is reset (step S324), the recording medium is transferred from the source element address in LUN, stored in the control data, to the destination element address in LAU (step S325) and the process is terminated.

In step S322, in case the destination element address is not lower than 0100 and the flag is not set in step S323, the command proceeds with the procedure in and after step S337 in FIG. 36.

In step S321, unless the source element address is 0100, it is compared with the address 0101 (step S326). If the source element address is 0101, the destination element address is compared with the address 0100 (step S327). If the destination element address is lower than 0100, it is confirmed if the flag of the control data 'DAU 0–LAU' is set (step S328).

If the flag is set, this command represents the recording medium transfer from DAU 0 to LAU. The flag of the control data is reset (step S329), the recording medium is transferred from the source element address in LUN, stored in the control data, to the destination element address in LAU (step S325) and the process is terminated.

In step S327, in case the destination element address is not lower than 0100 and the flag is not set in step S328, the command proceeds with the procedure in and after step S337 in FIG. 36.

In step S326, unless the source element address is 0101, it is compared with the address 0102 (FIG. 36, step S331). If the source element address is 0102, the destination element address is compared with the address 0100 (step S332). If the destination element address is lower than 0100, it is confirmed if the flag of the control data 'RAU–LAU' is set (step S333).

If the flag is set, this command represents the recording medium transfer from RAU to LAU. The flag of the control data 'RAU–LAU' is reset (step S339), the recording medium is transferred from the source element address in LUN, stored in the control data, to the destination element address in LAU (step S325) and the process is terminated.

In step S332, in case the destination element address is not lower than 0100 and the flag is not set in step S333, the command proceeds with the procedure in and after step S337.

In step S331, unless the source element address is 0102, it is determined if it is not lower than 0103 and not higher than 010A (step S334). If the source element address is within this range, the source corresponds to MTU 4 in TAU 0.

Then, the destination element address is compared with the address 0100 (step S335). If the destination element address is lower than 0100, with reference to the address table in FIG. 11, the recording medium is transferred from MTU 4 in TAU 0 to LAU (step S336) and the process is terminated. If the destination element address is not lower than 0100 in step S335, the command proceeds with the procedure in and after step S337.

An explanation is now given for the first to the fourth operating examples described above, in accordance with the flowcharts from FIG. 13 to FIG. 36. In the first operating example, the library controller 1 receives the MOVE command for LUN 1 (FIG. 13, step S11), and starts processing for LUN 1 (step S18).

Since the source element address of the command is 1000, the determination result in FIG. 17, step S71 is YES. And, since the destination element address of the command is FF02, the destination result in FIG. 18, step S86 is YES. The library controller 1 sets the flag of the control data 'DAU 0–TAU 0' (step S87), and writes LUN=1 and the source element address 1000 to the control data.

Next, the library controller 1 receives the MOVE command for LUN 2 (step S11), and starts processing for LUN 2 (step S21). Since the source element address of the command is 1001, the determination result in FIG. 27, step S202 is YES. Since the destination element address is 0001, the determination result in FIG. 29, step S232 is YES.

Then, the library controller 1 resets the flag of the control data 'DAU 0–TAU 0' (step S233). With reference to LUN and the source element address written in the control data, the library controller 1 directs the ACC 6 to mount the recording medium from the address 1000 in DAU 0 to MTU 4 at the address 0001 in TAU 0 (step S234).

In the second operating example, the library controller 1 receives the MOVE command for LUN 0 (step S11), and starts processing for LUN 0 (step S15). Since the source element address of the command is 0002, the determination result in FIG. 14, step S31 is YES. Since the destination element address is 0104, the determination result in step S43 is YES.

Then, the library controller 1 refers to the address table in FIG. 11, and directs the ACC 6 to mount the recording medium from the address 0002 in RAU to MTU 4 at the address 0001 in TAU 0 (step S44).

In the third operating example, the library controller 1 receives the MOVE command for LUN 1 (step S11), and starts processing for LUN 1 (step S18). Since the source element address of the command is 0000, the determination result in FIG. 17, step S71 is YES. Since the destination element address is FF05, the determination result in FIG. 18, step S90 is YES.

Then, the library controller 1 directs the ACC 6 to transfer the recording medium from the address 0000 in DAU 0 to CAS 5 in RAU (step S91).

In the fourth operating example, the library controller 1 receives the MOVE command for LUN 1 after the operator sets DAU 0 to the NOT READY state (step S11), and determines that the determination result in step S17 is NO. The library controller 1 returns the NOT READY response to the host computer 21 (step S14).

However, when the library controller 1 receives the MOVE command for a logical unit in the READY state other than LUN 1, the library controller 1 starts processing for the logical unit (steps S15, S21, S24).

In the operating examples described above, at least either the source element address or the destination element address of the MOVE command corresponds to the existing real element. On the other hand, it is possible, for example, in the case of the recording medium transfer from RAU to TAU 0 with the frame DAU 0 as the virtual intermediate frame, that both the source and the destination element addresses correspond to the virtual elements.

When the process stops due to an error while the ACC 6 stores a recording medium, the address 0001 of CAS 5 and the addresses FF05 and 1005 of the import/export element 42 can be designated to the source element address during the error recovery procedure. Further, these addresses can be used for the destination element address.

In the preferred embodiments explained above, the library device 22 is logically divided in units of frame. Regardless of the above examples, any division unit can be defined as a logical unit. It is not necessary to use all of the virtual elements shown in FIG. 6. Any number of virtual elements can be eliminated or added.

In addition, the control object of the present invention is not necessarily limited to the library device. Similar types of control methods can be applied to other logically dividable devices or systems.

The present invention can control the library device by means of the general-use interface, such as SCSI. In particular, the effects described below are obtained when the library device is controlled through SCSI.

By logically dividing the large-scale library device having a greater number of addresses than are available using 2 bytes, the present invention can provide the control method under the command of the medium changer device in SCSI, as defined by ANSI.

Further, in the SCSI interface, a partial NOT READY state in the library device cannot be defined when the library device is wholly controlled as one logical unit. If the library device is virtually divided, the NOT READY state can be defined in units of logical units.

When the number of frames in the library device are increased, no modification of the recording medium information including addresses of existing elements is required, by defining each added frame as a new logical unit.

Moreover, as the element address is controlled in each LUN (frame), the address can be uniquely defined irrespective of the condition of the frame assignment in each model. Accordingly, the element addresses can be assigned in the unit during manufacture.

What is claimed is:

1. A library control device, comprising:
   a memory device storing logical structure information representing a logical structure of a library device which includes a plurality of storage parts, each storing a plurality of recording media transferable between two of the storage parts, wherein said library device is divided into a plurality of logical units suitable for independent control, each logical unit having a virtual import/export element and one of an accessor and a virtual transport element, the logical structure information including an identifier of each logical unit and an address information of the virtual import/export element, the accessor, and the virtual transport element, the address information of the virtual transport element corresponding to the address information of the accessor; and
   a controlling device controlling operation of said library device by interpreting a command from a system interface using said logical structure information, wherein when a first command and a second command are issued to a first logical unit and a second logical unit, respectively, address information of a virtual import/export element in the first logical unit is specified as a destination element address of the first command, and address information of a virtual import/ export element in the second logical unit is specified as a source element address of the second command, said controlling device recognizes that the destination element address of the first command corresponds to the source element address of the second command by using the logical structure information and controls the library device to transfer a recording medium with the accessor directly from a source element address of the first command to a destination element address of the second command.

2. A library control device as recited in claim 1, wherein said memory device stores said logical structure information defining each of the storage parts as said logical units, and manages addresses of elements contained in said library device independently in each storage part.

3. A library control device as recited in claim 1, wherein said controlling device sets one of READY and NOT READY states in each of said logical units.

4. A library control device as recited in claim 1, wherein said memory device stores said logical structure information defining said plurality of logical units as logical units in a small computer system interface, and said controlling device interprets a command of the small computer system interface issued to at least one of said plurality of logical units using said logical structure information.

5. A library control device as recited in claim 1, wherein said memory device stores said logical structure information defining said plurality of logical units as medium changer devices in a small computer system interface.

6. A library control device as recited in claim 5, wherein said controlling device receives a plurality of commands from a host computer connected to said library device, and processes said plurality of commands as being linked.

7. A library control device as recited in claim 1, wherein said virtual import/export element is used to transfer a recording medium between two adjacent logical units and said controlling device controls said plurality of logical units as a library device set via said virtual import/export element.

8. A library control device as recited in claim 1, wherein said virtual import/export element is used to transfer a recording medium between two remote logical units and said controlling device controls said plurality of logical units as a library device set via said virtual import/export element.

9. A library control device as recited in claim 1, wherein at least one of said plurality of logical units has a virtual functional element corresponding to a unit for driving a recording medium and said controlling device controls said library device using said virtual functional element.

10. A library device, comprising:
    a storing device including a plurality of storage parts, each storing a plurality of recording media transferable between two of the storage parts; and
    a controlling device controlling the library device by dividing the library device into a plurality of logical units suitable for independent control and interpreting a command from a system interface issued to at least one of the plurality of logical units, each logical unit having a virtual import/export element and one of an accessor and a virtual transport element, said command specifying an address information of the virtual import/ export element, the accessor, and the virtual transport element, the address information of the virtual transport element corresponding to the address information of the accessor, wherein when a first command and a second command are issued to a first logical unit and a second logical unit, respectively, address information of a virtual import/export element in the first logical unit is specified as a destination element address of the first command, and address information of a virtual import/export element in the second logical unit is specified as a source element address of the second command, said controlling recognizes that the destination element address of the first command corresponds to the source element address of the second command by using the logical structure information and controls the library device to transfer a recording medium with the accessor directly from a source element address of the first command to a destination element address of the second command.

11. A control device, comprising:
    a memory device storing logical structure information representing a logical structure of a control object which includes a plurality of storage parts, each storing a plurality of recording media transferable between two of the storage parts, wherein said control object is divided into a plurality of logical units suitable for independent control, each logical unit having a virtual import/export element and one of an accessor and a virtual transport element, the logical structure information including an identifier of each logical unit and an address information of the virtual import/export element, the accessor, and the virtual transport element, the address information of the virtual transport element corresponding to the address information of the accessor; and a controlling device controlling said control object by interpreting a command from a system interface issued to at least one of the plurality of logical units using said logical structure information, said command specifying the address information of the virtual import/export element wherein when a first command and a second command are issued to a first logical unit and a second logical unit, respectively, address information of a virtual import/export element in the first logical unit is specified as a destination element address of the first command, and address information of a virtual import/export element in the second logical unit is specified as a source element address of the second command, said controlling device recognizes that the destination element address of the first command corresponds to the source element address of the second command by using the logical structure information and controls the library device to transfer a recording medium with the accessor directly from a source element address of the first command to a destination element address of the second command.

12. A host system, comprising:

a memory device storing logical structure information representing a logical structure of a library device which includes a plurality of storage parts, each storing a plurality of recording media transferable between two of the storage parts, wherein said library device is divided into a plurality of logical units suitable for independent control, each logical unit having a virtual import/export element and one of an accessor and a virtual transport element, the logical structure information including an identifier of each logical unit and an address information of the virtual import/export element, the accessor, and the virtual transport element, the address information of the virtual transport element corresponding to the address information of the accessor; and a command issue means for issuing a command from a system interface for each of said plurality of logical units, said command specifying the address information of the virtual import/export element, and wherein when a first command and a second command are issued to a first logical unit and a second logical unit, respectively, address information of a virtual import/export element in the first logical unit is specified as a destination element address of the first command, and address information of a virtual import/export element in the second logical unit is specified as a source element address of the second command, said controlling device recognizes that the destination element address of the first command corresponds to the source element address of the second command by using the logical structure information and controls the library device to transfer a recording medium with the accessor directly from a source element address of the first command to a destination element address of the second command.

13. A host system as recited in claim 12, further comprising an execution device executing an application program, wherein said command issue device issues a plurality of commands linked with each other on the basis of an instruction from said application program.

14. A library control method, comprising controlling the operation of a library device which includes a plurality of storage parts, each storing a plurality of recording media transferable between two of the storage parts, by dividing said library device into a plurality of logical units suitable for independent control and interpreting a command from a system interface issued to at least one of the plurality of logical units, each logical unit having a virtual import/export element and one of an accessor and a virtual transport element, said command specifying an address information of the virtual import/export element, the accessor, and the virtual transport element, the address information of the virtual transport element corresponding to the address information of the accessor, and wherein when a first command and a second command are issued to a first logical unit and a second logical unit, respectively, address information of a virtual import/export element in the first logical unit is specified as a destination element address of the first command, and address information of a virtual import/export element in the second logical unit is specified as a source element address of the second command, said controlling recognizes that the destination element address of the first command corresponds to the source element address of the second command by using the logical structure information and controls the library device to transfer a recording medium with the accessor directly from a source element address of the first command to a destination element address of the second command.

15. A library control method as recited in claim 14, wherein said plurality of logical units are defined as medium changer devices of a small computer system interface.

16. A library control method as recited in claim 14, wherein said virtual import/export element transfers a recording medium between two adjacent logical units, and said plurality of logical units are controlled as a library device set via said virtual import/export element.

17. A library control method as recited in claim 14, wherein said virtual import/export element transfers a recording medium between two remote logical units, and said plurality of logical units are controlled as a library device set via said virtual import/export element.

18. A library control method as recited in claim 14, wherein said library device is controlled by providing a virtual functional element for driving a recording medium and by making said functional element execute a virtual drive of the recording medium.

19. A control method, comprising controlling a control object which includes a plurality of storage parts, each storing a plurality of recording media transferable between two of the storage parts, by dividing said control object into a plurality of logical units suitable for independent control and interpreting a command from a system interface issued to at least one of the plurality of logical units, each logical unit having a virtual import/export element and one of an accessor and a virtual transport element, said command specifying an address information of the virtual import/export element, the accessor, and the virtual transport element, the address information of the virtual transport element corresponding to the address information of the accessor, and wherein when a first command and a second command are issued to a first logical unit and a second logical unit, respectively, address information of a virtual import/export element in the first logical unit is specified as a destination element address of the first command, and address information of a virtual import/export element in the second logical unit is specified as a source element address of the second command, said controlling recognizes that the destination element address of the first command corresponds to the source element address of the second command by using the logical structure information and controls the library device to transfer a recording medium with the accessor directly from a source element address of the first command to a destination element address of the second command.

20. A computer-readable recording medium storing a program for directing a computer to control operation of a library device which includes a plurality of storage parts, each storing a plurality of recording media transferable between two of the storage parts, by dividing said library device into a plurality of logical units suitable for independent control and interpreting a command from a system interface issued to at least one of the plurality of logical units, each logical unit having a virtual import/export element and one of an accessor and a virtual transport element, said command specifying an address information of the virtual import/export element, the accessor, and the virtual transport element, the address information of the virtual transport element corresponding to the address information of the accessor, and wherein when a first command and a second command are issued to a first logical unit and a second logical unit, respectively, address information of a virtual import/export element in the first logical unit is specified as a destination element address of the first command, and address information of a virtual import/export element in the second logical unit is specified as a source element address of the second command, the control recognizes that the destination element address of the first command corresponds to the source element address of the second command by using the logical structure information and controls the library device to transfer a recording medium with the accessor directly from a source element address of the first command to a destination element address of the second command.

21. A computer-readable recording medium storing a program for directing a computer to control a control object which includes a plurality of storage parts, each storing a plurality of recording media transferable between two of the storage parts, by dividing said control object into a plurality of logical units suitable for independent control and interpreting a command from a system interface issued to at least one of the plurality of logical units, each logical unit having a virtual import/export element and one of an accessor and a virtual transport element, said command specifying an address information of the virtual import/export element, the accessor, and the virtual transport element, the address information of the virtual transport element corresponding to the address information of the accessor, and wherein when a first command and a second command are issued to a first logical unit and a second logical unit, respectively, address information of a virtual import/export element in the first logical unit is specified as a destination element address of the first command, and address information of a virtual import/export element in the second logical unit is specified as a source element address of the second command, the control recognizes that the destination element address of the first command corresponds to the source element address of the second command by using the logical structure information and controls the library device to transfer a recording medium with the accessor directly from a source element address of the first command to a destination element address of the second command.

22. A library control device comprising:
a storage device storing recording media, the recording media divided into logical units, each having a virtual import/export element and one of an accessor and a virtual transport element that are independently addressable; and
a controller having independent control of each logical unit and logically mapped to virtual controllers that correspond to each logical unit, wherein the virtual controllers are accessed from a host computer using a small computer system interface (SCSI), and wherein when a destination element address of a first command corresponds to a source element address of a second command with a different logical unit, controlling the storage device to transfer a recording medium with the accessor directly from a source element address of the first command to a destination element address of the second command.

23. A library control method, comprising:
dividing a storage device into logical units, where each logical unit has a virtual import/export element and one of an accessor and a virtual transport element that are independently addressable;
selecting a logical unit using a system interface; and
independently controlling the selected logical unit using a small computer system interface (SCSI) by addressing virtual controllers corresponding to the logical units, wherein when a destination element address of a first command corresponds to a source element address of a second command with a different logical unit, controlling the storage device to transfer a recording medium with the accessor directly from a source element address of the first command to a destination element address of the second command.

24. A computer readable storage medium storing a program allowing a computer to perform:
dividing a storage device into logical units, where each logical unit has a virtual import/export element and one of an accessor and a virtual transport element that are independently addressable;
selecting a logical unit using a system interface; and
independently controlling the selected logical unit using a small computer system interface (SCSI) by addressing virtual controllers corresponding to the logical units, wherein when a destination element address of a first command corresponds to a source element address of a second command with a different logical unit, controlling the storage device to transfer a recording medium with the accessor directly from a source element address of the first command to a destination element address of the second command.

25. A library control device, comprising:
a memory device storing logical structure information representing a structure of a library device, the library device including a plurality of storage parts each having an independently addressable logical accessor and a logical importing/exporting mechanism and storing a plurality of recording media transferable between two of the storage parts through the logical importing/exporting mechanism, divided into a plurality of logical units for use with a system interface each suitable for independent control, where each logical unit has a virtual import/export element and one of an accessor and a virtual transport element that are independently addressable; and
a controlling device controlling operation of said library device by interpreting and executing commands from the system interface issued to at least one of the plurality of logical units using said logical structure information, wherein when a destination element address of a first of the commands corresponds to a source element address of a second of the commands with a different logical unit, controlling the storage device to transfer a recording media with the accessor directly from a source element address of the first command to a destination element address of the second command.

* * * * *

UNITED STATES PATENT AND TRADEMARK OFFICE
CERTIFICATE OF CORRECTION

PATENT NO. : 6,604,165 B1
DATED : August 5, 2003
INVENTOR(S) : Yoshinori Terao

It is certified that error appears in the above-identified patent and that said Letters Patent is hereby corrected as shown below:

<u>Title page,</u>
Item [75], Inventor, should read as
-- [75] Inventor: Yoshinori, Terao, Yokohama (JP) --.

Signed and Sealed this

Eighth Day of June, 2004

JON W. DUDAS
*Acting Director of the United States Patent and Trademark Office*